(12) United States Patent
Wang et al.

(10) Patent No.: US 12,055,794 B2
(45) Date of Patent: *Aug. 6, 2024

(54) GLASSES

(71) Applicant: SHENZHEN SHOKZ CO., LTD., Guangdong (CN)

(72) Inventors: Yueqiang Wang, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 756 days.

This patent is subject to a terminal disclaimer.

(21) Appl. No.: 17/170,919

(22) Filed: Feb. 9, 2021

(65) Prior Publication Data

US 2021/0165243 A1 Jun. 3, 2021

Related U.S. Application Data

(63) Continuation of application No. PCT/CN2019/102396, filed on Aug. 24, 2019.

(30) Foreign Application Priority Data

Aug. 24, 2018 (CN) .......................... 201810975515.1

(51) Int. Cl.
 *G02C 5/22* (2006.01)
 *G02C 5/00* (2006.01)
 (Continued)

(52) U.S. Cl.
 CPC .............. *G02C 11/10* (2013.01); *G02C 5/001* (2013.01); *G02C 5/143* (2013.01); *G02C 5/16* (2013.01);
 (Continued)

(58) Field of Classification Search
 CPC ...... G02C 5/2254; G02C 5/001; G02C 5/143; G02C 5/16; G02C 5/2218; G02C 5/2227; G02C 5/20; G02C 11/10
 (Continued)

(56) References Cited

U.S. PATENT DOCUMENTS

| | | |
|---|---|---|
| 4,902,120 A | 2/1990 | Weyer |
| 7,289,767 B2 | 10/2007 | Lai |

(Continued)

FOREIGN PATENT DOCUMENTS

| | | |
|---|---|---|
| CN | 2639920 Y | 9/2004 |
| CN | 102141688 A | 8/2011 |

(Continued)

OTHER PUBLICATIONS

First Office Action in Chinese Application No. 201810975515.1 mailed on Apr. 13, 2023, 22 pages.

*Primary Examiner* — Mahidere S Sahle
(74) *Attorney, Agent, or Firm* — METIS IP LLC

(57) ABSTRACT

The present disclosure provides a glasses. The glasses may include a glasses frame and two speakers. The glasses frame may include a glasses rim and two glasses temples. The two glasses temples may be rotatably connected to the glasses rim, respectively. For each of the two speakers, the speaker may include an earphone core and a core housing. The speaker may be connected to one of the two glasses temples via a hinge component connected thereto. The hinge component may be rotatable to change a position of the speaker relative to the glasses temple. The core housing may include a contact surface. The contact surface may include a gradient structure for causing an uneven distribution of pressure on the contact surface when in contact with a user. The glasses temple connected to the speaker may include at least one of a control circuit or a battery. The at least one of the control circuit or the battery may drive the earphone core of the (Continued)

speaker to vibrate to generate sound. The glasses of the present disclosure may meet various requirements of people when wearing glasses, and a hinge state of the glasses may be switched easily, thereby providing convenience for users.

18 Claims, 19 Drawing Sheets

(51) Int. Cl.
*G02C 5/14* (2006.01)
*G02C 5/16* (2006.01)
*G02C 11/00* (2006.01)
*H04R 1/02* (2006.01)
*H04R 1/10* (2006.01)
*H04R 5/033* (2006.01)
*H04R 9/02* (2006.01)
*H04R 9/04* (2006.01)
*H04R 9/06* (2006.01)
*G02C 5/20* (2006.01)

(52) U.S. Cl.
CPC ......... *G02C 5/2218* (2013.01); *G02C 5/2227* (2013.01); *G02C 5/2254* (2013.01); *H04R 1/025* (2013.01); *H04R 1/028* (2013.01); *H04R 1/1008* (2013.01); *H04R 1/1066* (2013.01); *H04R 5/0335* (2013.01); *H04R 9/025* (2013.01); *H04R 9/045* (2013.01); *H04R 9/06* (2013.01); *G02C 5/20* (2013.01); *H04R 2400/03* (2013.01); *H04R 2460/13* (2013.01); *H04R 2499/10* (2013.01)

(58) Field of Classification Search
USPC .......................................... 351/41, 153, 158
See application file for complete search history.

(56) References Cited

U.S. PATENT DOCUMENTS

| | | | |
|---|---|---|---|
| 2005/0248717 A1* | 11/2005 | Howell | G02C 11/06 351/41 |
| 2006/0098829 A1 | 5/2006 | Kobayashi | |
| 2006/0262954 A1 | 11/2006 | Lee et al. | |
| 2008/0013041 A1 | 1/2008 | Chou | |
| 2008/0074609 A1 | 3/2008 | Ifergan | |
| 2009/0190781 A1 | 7/2009 | Fukuda | |
| 2009/0285417 A1 | 11/2009 | Shin et al. | |
| 2011/0200204 A1 | 8/2011 | Horigome et al. | |
| 2013/0163791 A1 | 6/2013 | Qi et al. | |
| 2013/0329919 A1 | 12/2013 | He | |
| 2014/0253867 A1 | 9/2014 | Jiang et al. | |
| 2015/0257662 A1 | 9/2015 | Lee et al. | |
| 2016/0234613 A1 | 8/2016 | Westerkull | |
| 2016/0246076 A1 | 8/2016 | Wei | |
| 2016/0329041 A1 | 11/2016 | Qi et al. | |
| 2017/0090201 A1 | 3/2017 | Guo | |
| 2020/0336824 A1 | 10/2020 | Zheng et al. | |
| 2020/0344542 A1 | 10/2020 | Liu et al. | |

FOREIGN PATENT DOCUMENTS

| | | |
|---|---|---|
| CN | 201984240 U | 9/2011 |
| CN | 202306037 U | 7/2012 |
| CN | 202364340 U | 8/2012 |
| CN | 203786416 U | 8/2014 |
| CN | 204374548 U | 6/2015 |
| CN | 105007551 A | 10/2015 |
| CN | 204887455 U | 12/2015 |
| CN | 205103503 U | 3/2016 |
| CN | 205301727 U | 6/2016 |
| CN | 205720956 U | 11/2016 |
| CN | 205793159 U | 12/2016 |
| CN | 205961389 U | 2/2017 |
| CN | 206061075 U | 3/2017 |
| CN | 206292473 U | 6/2017 |
| CN | 106937221 A | 7/2017 |
| CN | 106954150 A | 7/2017 |
| CN | 106954151 A | 7/2017 |
| CN | 106954153 A | 7/2017 |
| CN | 106974645 A | 7/2017 |
| CN | 206365029 U | 7/2017 |
| CN | 106997107 A | 8/2017 |
| CN | 206387972 U | 8/2017 |
| CN | 206421112 U | 8/2017 |
| CN | 206563855 U | 10/2017 |
| CN | 206640748 U | 11/2017 |
| CN | 206920741 U | 1/2018 |
| CN | 107948881 A | 4/2018 |
| CN | 207424414 U | 5/2018 |
| CN | 207443120 U | 6/2018 |
| CN | 108391188 A | 8/2018 |
| CN | 207718105 U | 8/2018 |
| CN | 207720370 U | 8/2018 |
| CN | 108600920 A | 9/2018 |
| CN | 108776393 A | 11/2018 |
| CN | 108845436 A | 11/2018 |
| CN | 108873372 A | 11/2018 |
| CN | 109061902 A | 12/2018 |
| CN | 109495809 A | 3/2019 |
| CN | 208780924 U | 4/2019 |
| CN | 208780925 U | 4/2019 |
| CN | 208780926 U | 4/2019 |
| CN | 208780932 U | 4/2019 |
| CN | 208847977 U | 5/2019 |
| CN | 208847981 U | 5/2019 |
| JP | S59161928 A | 9/1984 |
| JP | 2006157318 A | 6/2006 |
| WO | 9623373 A1 | 8/1996 |
| WO | 2006023341 A2 | 3/2006 |
| WO | 2007070508 A2 | 6/2007 |
| WO | 2007133055 A1 | 11/2007 |
| WO | 2015115693 A1 | 8/2015 |

* cited by examiner

GLASSES

CROSS-REFERENCE TO RELATED APPLICATION

This application is a Continuation of International Application No. PCT/CN2019/102396, filed on Aug. 24, 2019, which claims priority of Chinese Patent Application No. 201810975515.1, filed on Aug. 24, 2018, the contents of each of which are hereby incorporated by reference in its entirety.

TECHNICAL FIELD

The present disclosure relates to the field of glasses, and more specifically relates to glasses having a hinge component.

BACKGROUND

People often wear glasses in daily life, such as short-sighted glasses, far-sighted glasses, sunglasses, virtual reality (VR) glasses, massage glasses, etc. However, these glasses have a single function and cannot meet multiple requirements of people at the same time. For example, people often wear sunglasses when going out for sports or traveling. However, if they want to listen to music at the same time, they need to prepare additional speakers, which is not convenient to carry and store. Therefore, glasses with a speaker function bring great convenience to users.

SUMMARY

An embodiment of the present disclosure may provide glasses. The glasses may include a glasses frame and two speakers. The glasses frame may include a glasses rim and two glasses temples. The two glasses temples may be rotatably connected to the glasses rim, respectively. For each of the two speakers, the speaker may include an earphone core and a core housing. The speaker may be connected to one of the two glasses temples via a hinge component connected thereto. The hinge components may be rotatable to change a position of the speaker relative to the glasses temple. The core housing may include a contact surface. The contact surface may include a gradient structure for causing an uneven distribution of pressure on the contact surface when in contact with a user. The glasses temple connected to the speaker may include at least one of a control circuit or a battery. The at least one of the control circuit or the battery may be configured to drive the earphone core to vibrate to generate sound.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
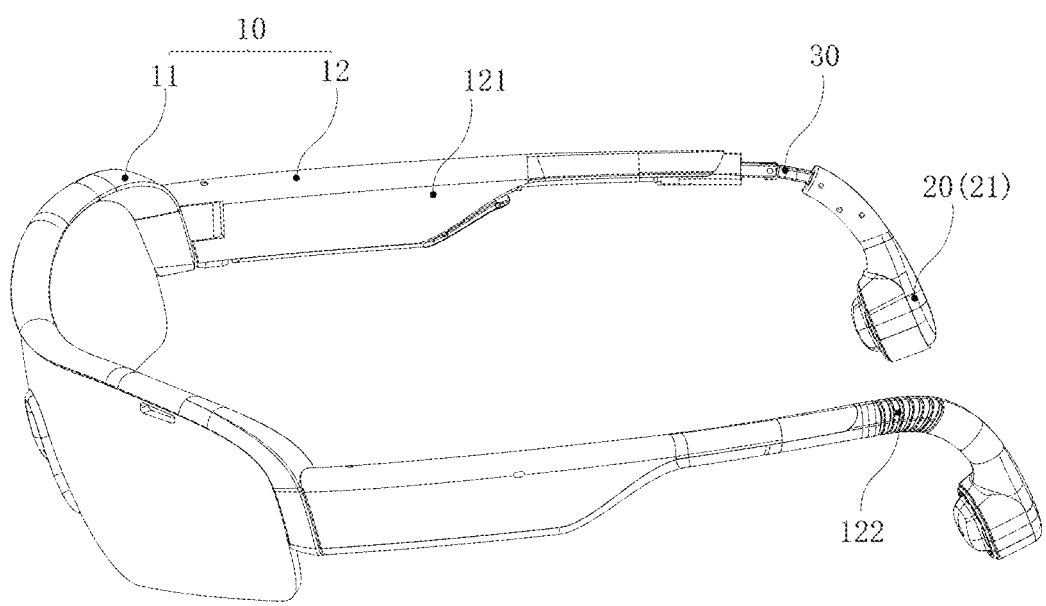
FIG. 1 is a schematic structural diagram illustrating glasses according to some embodiments of the present disclosure.

In order to illustrate the technical solutions related to the embodiments of the present disclosure, the drawings used to describe the embodiments are briefly introduced below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

As used in the disclosure and the appended claims, the singular forms "a," "an," and "the" may include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment;" the term "another embodiment" means "at least one other embodiment." Related definitions of other terms will be given in the description below. In the following, without loss of generality, the "glasses" or "sunglasses" described in the present disclosure means "glasses" or "sunglasses" with a speaker. For those skilled in the art, "glasses" or "sunglasses" may also be replaced with other similar words, such as "eye protection device," "eye wearable device," or the like. "Speaker" may also be replaced with other similar words, such as "speaker," "hearing aid," "player," "playing device," or the like. For those skilled in the art, after understanding the basic principles of glasses, it may be possible to make various modifications and changes in the form and details of the specific methods and operations of implementing glasses without departing from the principles. In particular, an environmental sound collection and processing function may be added to the glasses to enable the glasses to implement the function of a hearing aid. For example, a microphone may collect environmental sounds of a user/wearer, process the sounds using an algorithm and transmit the processed sound (or generated electrical signal) to a speaker of glasses. That is, the glasses may be modified to include the function of collecting the environmental sounds, and after a signal processing, the sound may be transmitted to the user/wearer via the speaker, thereby implementing the function of the hearing aid. As an example, the algorithm mentioned herein may include noise cancellation, automatic gain control, acoustic feedback suppression, wide dynamic range compression, active environment recognition, active noise reduction, directional processing, tinnitus processing, multi-channel wide dynamic range compression, active howling suppression, volume control, or the like, or any combination thereof.

Referring to FIG. 1, FIG. 1 is a schematic structural diagram illustrating glasses according to an embodiment of the present disclosure. In the embodiment, the glasses may include a glasses frame 10 and a function member 20.

In some embodiments, the glasses frame 10 in the present disclosure may include glasses frames of various glasses such as short-sighted glasses, far-sighted glasses, sunglasses, 3D glasses, etc., and be not limited herein.

The function member 20 may be connected to the glasses frame 10 so that the glasses may further have some other functional modules or components. For example, the function member 20 may include a speaker including a bone conduction speaker, an air conduction speaker, or the like. Of course, the function member 20 may also include other components, such as a positioning device, and be not limited herein.

In some embodiments, the glasses frame 10 may include a glasses rim 11 and two glasses temples 12. The glasses temple 12 may include a main body 121 of the glasses temple and a hinge component 122. The main body 121 may be rotatably connected to the glasses rim 11. A speaker 21 may be connected to the glasses temple 12 via the hinge component 122.

Figure 2:
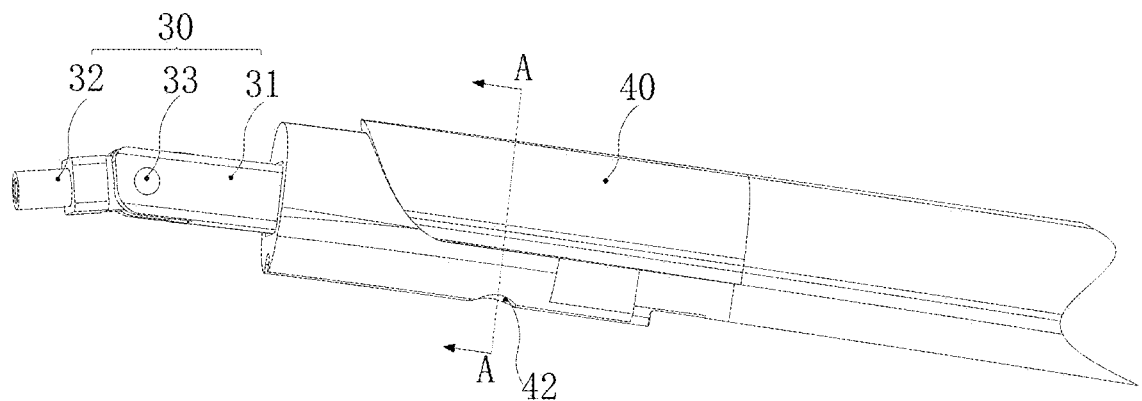
FIG. 2 is a schematic structural diagram illustrating a hinge component according to some embodiments of the present disclosure.
Figure 3:
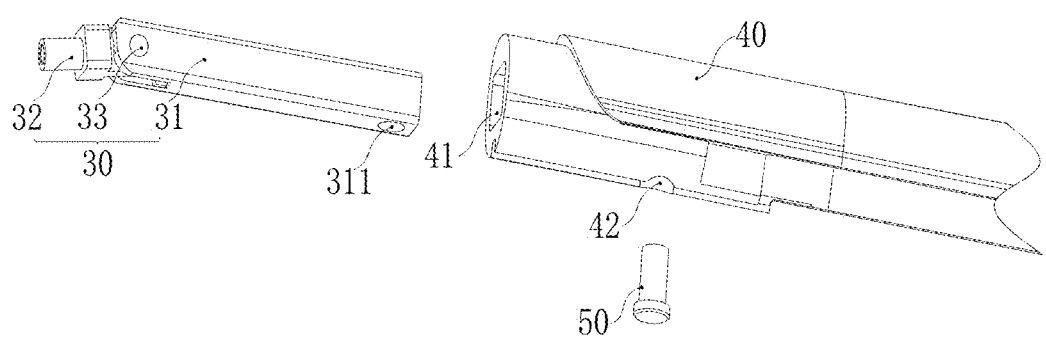
FIG. 3 is a schematic diagram illustrating an explosion structure according to some embodiments of the present disclosure.

FIG. 2 is a schematic structural diagram illustrating a hinge component according to an embodiment of the present disclosure. FIG. 3 is an exploded structural schematic diagram illustrating a hinge component according to an embodiment of the present disclosure. In some embodiments, the hinge component 122 of the present disclosure may be used in glasses in some embodiment of the present disclosure.

In the present disclosure, the hinge component 122 may include a hinge 30. The hinge 30 may be a structure used to connect two solids and allow a relative rotation between the two solids.

Specifically, when the hinge component 122 in the embodiment is used in the embodiment of the glasses described above, the hinge component 122 may be disposed at an end of the main body 121 of the glasses temple away from the glasses rim 11. The function member 20 may further be connected to the end of the main body 121 of the glasses temple away from the glasses rim 11 via the hinge 30.

In some embodiments, the hinge component 122 may also include a rod-shaped member 40 and a fixing member 50. In some embodiments, the hinge 30 may include a hinge mount 31 and a hinge arm 32. In some embodiments, the hinge arm 32 may be rotatably connected to the hinge mount 31 via a rotating shaft 33. It is easily understood that the hinge mount 31 and the hinge arm 32 may be respectively connected to two members that need to be rotatably connected. Therefore, the two members may be rotatably connected together via the rotating shaft 33 of the hinge 30.

In some embodiments, the hinge mount 31 of the hinge 30 may be connected to the rod-shaped member 40. In some embodiments, the rod-shaped member 40 may be a partial structure or an integral structure of one of the two members that are rotatably connected via the hinge 30. Alternatively, the rod-shaped member 40 may be a connection structure that connects one of the two members that need to be rotatably connected to the hinge 30. When the hinge component 122 in the embodiment is used for the glasses, the rod-shaped member 40 may be at least a portion of the main body 121 of the glasses temple of the glasses. For example, the rod-shaped member 40 may be the entirety of the main body 121 of the glasses temple. Alternatively, the rod-shaped member 40 may be a portion of an end of the main body 121 of the glasses temple away from the glasses rim 11. The hinge 30 may be disposed at the end of the main body 121 of the glasses temple away from the glasses rim 11 via the portion of the main body 121 of the glasses temple.

Specifically, the rod-shaped member 40 may be provided with a hinge chamber 41 connected to an end surface of the rod-shaped member 40 along the length direction. A side wall of the rod-shaped member 40 may be provided with a first insertion hole 42 communicating with the hinge chamber 41. The end of the hinge mount 31 away from the hinge arm 32 may be inserted into the hinge chamber 41 from the end surface of the rod-shaped member 40, and fixed in the hinge chamber 41 via a fixing member 50 inserted in the first insertion hole 42.

In the embodiment, the hinge chamber 41 may communicate with the end surface of the main body 121 of the glasses temple away from the end of the glasses rim 11. Therefore, the hinge mount 31 is inserted into the hinge chamber 41 and the hinge 30 is connected to the main body 121 of the glasses temple.

In some embodiments, the hinge chamber 41 may be formed during a molding process of the rod-shaped member 40. For example, the material of the rod-shaped member 40 may be rubber or plastic. At this time, the hinge chamber 41 may be formed by injection molding. The shape of the hinge chamber 41 may match the hinge mount 31 so that the hinge mount 31 may be accommodated inside the hinge chamber 41. In the embodiment, the main body 121 of the glasses temple may have the shape of a long straight rod along the length direction. Correspondingly, the rod-shaped member 40 may be a straight rod along the length direction, and the hinge chamber 41 may be disposed inside the straight rod. Further, the hinge mount 31 may match the hinge chamber 41 to be accommodated inside the hinge chamber 41 to implement the installation of the hinge 30. Of course, in other embodiments, the rod-shaped member 40 may also have other shapes such as an arc-shaped rod.

In addition, the first insertion hole 42 may be formed during the molding process of the rod-shaped member 40, or may be further formed on a side wall of the rod-shaped member by a manner such as drilling after the molding process. Specifically, in the embodiment, the shape of the first insertion hole 42 may be a circle, and may be other shapes such as a square or a triangle in other embodiments. The shape of the fixing member 50 may match the first insertion hole 42 so that the fixing member 50 may be inserted into the first insertion hole 42 from the outside of the rod 40. Further, the hinge mount 31 may be fixed inside the hinge chamber 41 by abutting the side wall of the hinge mount 31 or further penetrating the outer wall of the hinge mount 31 in a plugging manner. Specifically, a matching thread may be provided on the inner wall of the first insertion hole 42 and the outer wall of the fixing member 50. Therefore, the fixing member 50 may be connected to the first insertion hole 42 in a screwing manner to further fix the hinge mount 31 inside the hinge chamber 41. Of course, other manners may also be used, such as connecting the first insertion hole 42 and the fixing member 50 in an interference fit manner.

Further, the hinge arm 32 may also be connected to other components. Therefore, after the other components are connected to the hinge arm 32, the other components and the rod-shaped member 40 or other components connected to the rod-shaped member 40 may further rotate around the rotating shaft 33 by mounting the hinge mount 31 inside the hinge chamber 41. For example, when the hinge component 122 is used in the glasses, the function member 20 (e.g., the speaker 21) may be connected to the end of the hinge arm 32 away from the hinge mount 31. Therefore, the function member 20 may be connected to the end of the main body 121 of the glasses temple away from the glasses rim 11 via the hinge 30.

In the above manner, the rod-shaped member 40 may be provided with the hinge chamber 41 communicating with the end surface of the rod-shaped member 40. The hinge 30 may be accommodated inside the hinge chamber 41 via the hinge mount 31. The fixing member 50 may further penetrate the side wall of the rod 40 via the first insertion hole 42. Therefore, the hinge mount 31 accommodated inside the hinge chamber 41 may be fixed inside the hinge chamber 41. Therefore, the hinge 30 may be detached relative to the rod-shaped member 40 to facilitate the replacement of the hinge 30 or the rod-shaped member 40. When applied to the glasses in the embodiment of the present disclosure described above, the hinge 30 and the function member 20 may be detachable relative to the main body 121 of the glasses temple. Therefore, it may be easy to replace when the function member 20, the glasses rim 11, or the main body 121 of the glasses temple is damaged.

Further referring to FIG. 3, in one embodiment, the hinge mount 31 may be provided with a second insertion hole 311 corresponding to the first insertion hole 42. The fixing member 50 may be further inserted into the second insertion hole 311.

Specifically, the shape of the second insertion hole 311 may match the fixing member 50, so that the fixing member 50 may be further inserted into the second insertion hole 311 to fix the hinge mount 31 after passing through the first insertion hole 42. Therefore, the shaking of the hinge mount 31 inside the hinge chamber 41 may be reduced and the hinge 30 may be fixed more firmly. Specifically, similar to the connection manner of the first insertion hole 42 and the fixing member 50, the inner wall of the second insertion hole 311 may be provided with a matching thread corresponding to the outer wall of the fixing member 50. Therefore, the fixing member 50 and the hinge mount 31 may be screwed together. Alternatively, the inner wall of the second insertion hole 311 and the outer wall of a corresponding contact position of the fixing member 50 may be smooth surfaces. Therefore, the fixing member 50 and the second insertion hole 311 may be in an interference fit, and be not specifically limited herein.

Further, the second insertion hole 311 may penetrate both sides of the hinge mount 31, so that the fixing member 50 may further penetrate the entire hinge mount 31. The hinge mount 31 may be more firmly fixed inside the hinge chamber 41.

Figure 4:
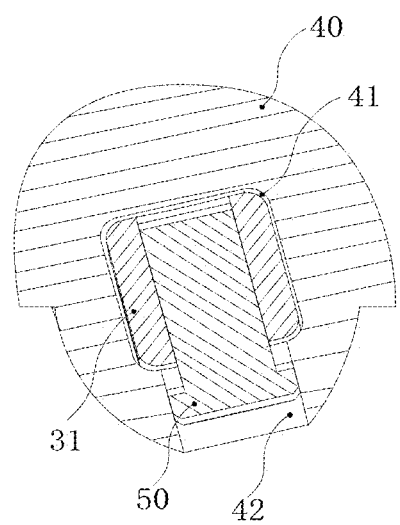
FIG. 4 illustrates a sectional view of the hinge component in FIG. 2 along an A-A axis according to some embodiments of the present disclosure.

Further referring to FIG. 4, FIG. 4 is a sectional view of the hinge component 122 in FIG. 2 along an A-A axis according to some embodiments of the present disclosure. In the embodiment, a cross-sectional shape of the hinge mount 31 may match a cross-sectional shape of the hinge chamber 41 in a section perpendicular to the longitudinal direction of the rod-shaped member 40. Therefore, the hinge mount 31 and the rod-shaped member 40 may form a tight fit after the insertion.

In some embodiments, the cross-sectional shape of the hinge mount 31 and the cross-sectional shape of the hinge chamber 41 may include any shape in the section shown in FIG. 4, as long as the hinge mount 31 is inserted into the hinge chamber 41 from an end surface of the rod-shaped member 40 away from the hinge arm 32. Further, the first insertion hole 42 may be disposed on a side wall of the hinge chamber 41, and pass through the side wall of the hinge chamber 41 and communicate with the hinge chamber 41.

In an application scenario, the cross-sectional shape of the hinge mount 31 and the cross-sectional shape of the hinge chamber 41 may have a rectangular shape. The first insertion hole 42 may be perpendicular to one side of the rectangle.

Specifically, in the application scenario, a corner angle of the outer wall of the hinge mount 31 or an angle of the inner wall of the hinge chamber 41 may be further in a fillet set to make contact between the hinge mount 31 and the hinge chamber 41 smoother. Therefore, the hinge mount 31 may be smoothly inserted into the hinge chamber 41.

It should be further pointed out that an amount of gas may be stored in the hinge chamber 41 before the hinge 30 is assembled. Therefore, if the hinge chamber 41 is a chamber with an open at only one end, the assembly of the hinge mount 31 may not be facilitated due to the difficulty in exhausting the gas inside the hinge chamber 41 during the assembly process. In the embodiment, the first insertion hole 42 may penetrate the side wall of the hinge chamber 41 and communicate with the hinge chamber 41 which may assist in exhausting the inner gas from the first insertion hole 42 through the hinge chamber 41 during the assembly, thereby facilitating the normal assembly of the hinge 30.

Figure 5:
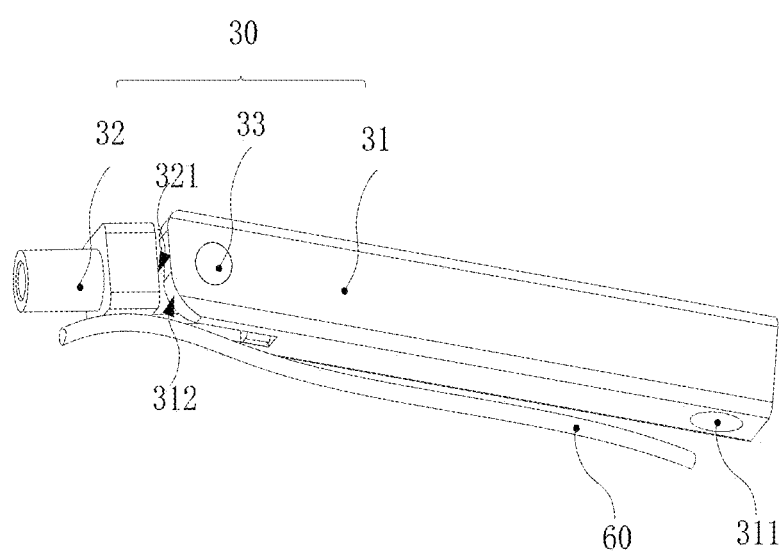
FIG. 5 is a schematic structural diagram illustrating a hinge component according to some embodiments of the present disclosure.
Figure 6:
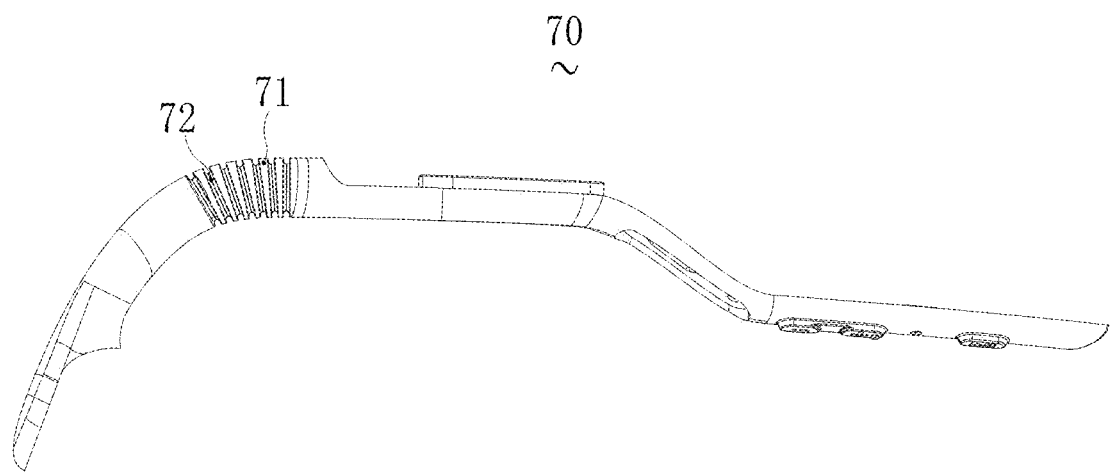
FIG. 6 is a diagram illustrating an original state of a protective sleeve according to some embodiments of the present disclosure.

Further referring to FIG. 5, FIG. 5 is a schematic structural diagram illustrating a hinge component according to an embodiment of the present disclosure. In the embodiment of the present disclosure, the hinge component 122 may further include a connection wire 60 disposed outside the hinge 30.

In some embodiments, the connection wire 60 may be a connection wire 60 having an electrical connection function and/or a mechanical connection function. When applied to the glasses in the embodiment of the present disclosure described above, the hinge component 122 may be used to connect the function member 20 to the end of the main body 121 of the glasses temple away from the glasses rim 11. A control circuit and the like related to the function member 20 may be disposed on the main body 121 of the glasses temple. At this time, the connection wire 60 may be required to electrically connect the function member 20 to the control circuit and the like of the main body 121 of the glasses temple. Specifically, the connection wire 60 may be located at one side of the hinge mount 31 and the hinge arm 32, and disposed in the same accommodation space with the hinge 30.

Further, the hinge mount 31 may include a first end surface 312. The hinge arm 32 may have a second end surface 321 disposed opposite the first end surface 312. It is easily understood that there is a gap between the first end surface 312 and the second end surface 321. Therefore, the hinge mount 31 and the hinge arm 32 may be relatively rotatable around the rotating shaft 33. In the embodiment, during the relative rotation of the hinge arm 32 and the hinge mount 31, relative positions between the first end surface 312 and the second end surface 321 may also change. Therefore, the gap between thereof may increase or decrease.

In the embodiment, the gap between the first end surface 312 and the second end surface 321 may always be kept larger than or less than the diameter of the connection wire 60. Therefore, the connection wire 60 located outside the hinge 30 may not be inserted into the gap between the first end surface 312 and the second end surface 321 during the relative rotation of the hinge mount 31 and the hinge arm 32, thereby reducing the damage to the connection wire 60 by the hinge. Specifically, during the relative rotation of the hinge arm 32 and the hinge mount 31, the ratio of the gap between the first end surface 312 and the second end surface 321 to the diameter of the connection wire 60 may always be kept greater than 1.5 or less than 0.8, for example, greater than 1.5, 1.7, 1.9, 2.0, etc., or less than 0.8, 0.6, 0.4, 0.2, etc., and be not specifically limited herein.

Figure 7:
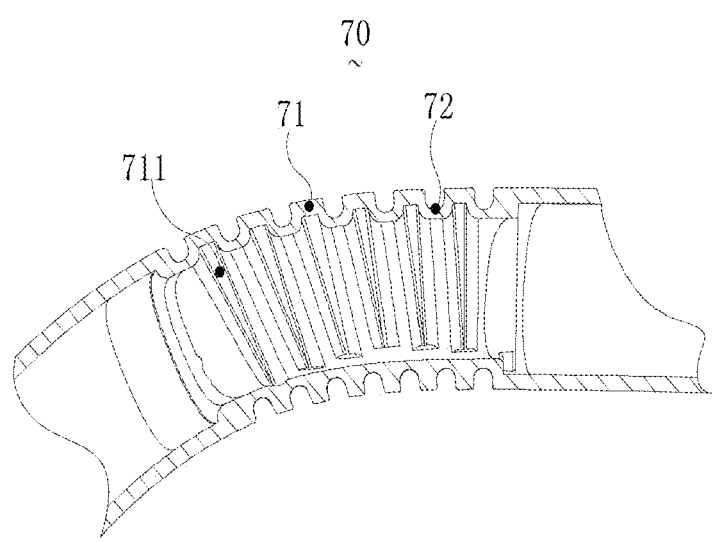
FIG. 7 illustrates a partial sectional view of an original state of a protective sleeve of a hinge component according to some embodiments of the present disclosure.
Figure 8:
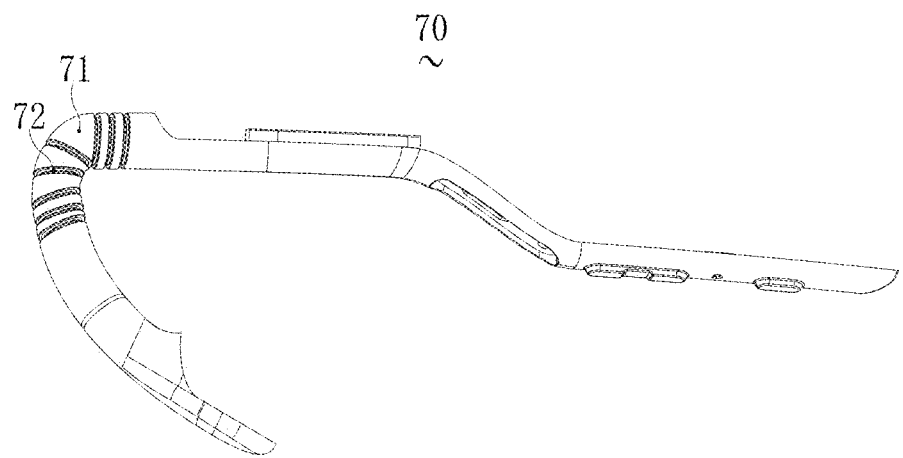
FIG. 8 is a diagram illustrating a bent state of a protective sleeve of a hinge component according to some embodiments of the present disclosure.
Figure 9:
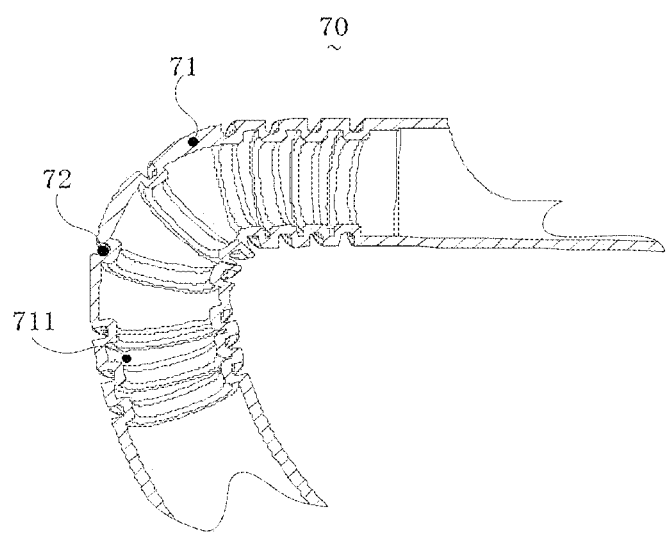
FIG. 9 illustrates a partial sectional view of a bent state of a hinge component protection sleeve according to some embodiments of the present disclosure.

Further referring to FIG. 2, and FIG. 6 to FIG. 9, FIG. 6 is a diagram illustrating an original state of a protective sleeve of a hinge component according to one embodiment of the present disclosure. FIG. 7 illustrates a partial sectional view of an original state of a protective sleeve of a hinge component according to an embodiment of the present disclosure. FIG. 8 is a diagram illustrating a bent state of a protective sleeve of a hinge component according to an embodiment of the present disclosure. FIG. 9 illustrates a partial sectional view of a folded state of a protective sleeve of a hinge component according to one embodiment of the present disclosure. In the embodiment, the hinge component 122 may also include a protective sleeve 70.

Specifically, the protective sleeve 70 may be disposed on the periphery of the hinge 30 and bent along with the hinge 30. In some embodiments, the protective sleeve 70 may include a plurality of annular ridge portions 71 spaced apart along the length direction of the protective sleeve 70 and annular connection portions 72 disposed between the annular ridge portions 71 and used to connect each two adjacent annular ridge portions. In some embodiments, the tube wall thickness of the annular ridge portion 71 may be greater than the tube wall thickness of the annular connection portion 72.

In some embodiments, the length direction of the protection sleeve 70 may be consistent with the length direction of the hinge 30. The protection sleeve 70 may be disposed along the length direction of the hinge mount 31 and the hinge arm 32. The protective sleeve 70 may be made of a soft material, such as soft silicone, rubber, etc.

The outer sidewall of the protective sleeve 70 may protrude outwardly to form the annular ridge portion 71. The shape of the inner sidewall of the protective sleeve 70 corresponding to the annular ridge portion 71 may not be specifically limited herein. For example, the inner wall may be smooth, or a recession may be disposed on the position of the inner wall corresponding to the annular ridge portion 71.

The annular connection portion 72 may be used to connect the adjacent annular ridge portions 71, specifically connected to an edge region of the annular ridge portion 71 near the inside of the protective sleeve 70. Therefore, the annular connection portion 72 may recess relative to the annular ridge portion 71 at a side of the outer wall of the protective sleeve 70.

Specifically, the count of the annular ridge portions 71 and the count of the annular connection portions 72 may be determined according to actual use conditions, for example, according to the length of the protective sleeve 70, the width of the annular ridge 71 and the width of the annular connection portion 72 in the longitudinal direction of the protective sleeve 70, or the like.

Further, the tube wall thickness of the annular ridge portion 71 and the tube wall thickness of the annular connection portion 72 refer to the thickness between the inner wall and the outer wall of the protective sleeve 70 corresponding to the annular ridge portion 71 and the annular connection portion 72, respectively. In the embodiment, the tube wall thickness of the annular ridge portion 71 may be greater than the tube wall thickness of the annular connection portion 72.

It should be easily understood when the hinge mount 31 and the hinge arm 32 of the hinge 30 are relatively rotatable around the rotating shaft 33, the angle between the hinge mount 31 and the hinge arm 32 may change so that the protective sleeve 70 is bent as shown in FIGS. 8 and 9. Specifically, when the protective sleeve 70 is bent with the hinge 30, the annular ridge portion 71 and the annular connection portion 72 located in an outer region of the bent shape formed by the protective sleeve 70 may be in a stretched state, while the annular ridge portion 71 and the annular connection portion 72 located in an inner region of the bent shape may be in a compressed state.

In the embodiment, the tube wall thickness of the annular ridge portion 71 may be greater than the tube wall thickness of the annular connection portion 72. Therefore, the annular ridge portion 71 may be more rigid than the annular connection portion 72. Therefore, when the protective sleeve 70 is in the bent state, the protective sleeve 70 at the outer side of the bent shape may be in the stretched state. The annular ridge portion 71 may provide a strength support for the protective sleeve 70. At the same time, a region of the protective sleeve 70 at the inner side in the bent state may be compressed. The annular ridge portion 71 may also withstand a compression force, thereby protecting the protective sleeve 70, improving the stability of the protective sleeve 70, and extending the life of the protective sleeve 70.

Further, it should be noted that the shape of the protective sleeve 70 may be consistent with the state of the hinge 30. In one application scenario, both sides of the protective sleeve 70 along the length direction and rotating around the rotating shaft may be stretched or compressed. In another application scenario, the hinge mount 31 and the hinge arm 32 of the hinge 30 may rotate around the rotating shaft 33 only within a range less than or equal to 180 degrees. That is, the protective sleeve 70 may only be bent toward one side. One side of the two sides of the protective sleeve 70 in the length direction may be compressed, and the other side may be stretched. At this time, according to different forces on the two sides of the protective sleeve 70, the two sides of the protective sleeve 70 under the different forces may have different structures.

In one embodiment, when the protective sleeve 70 is in the bent state, the width of the annular ridge portion 71 along the longitudinal direction of the protective sleeve 70 toward the outer side of the bent shape formed by the protective sleeve 70 may be greater than the width along the length of the protective sleeve 70 facing the inside of the bent shape.

In some embodiments, an increment of the width of the annular ridge portion 71 along the length direction of the protective sleeve 70 may further increase the strength of the protective sleeve. Meanwhile, in the embodiment, an original included angle between the hinge mount 31 and the hinge arm 32 may be less than 180 degrees. At this time, if the annular ridge portions 71 of the protective sleeve 70 are uniformly disposed, the protective sleeve 70 may be compressed in the original state. In the embodiment, the width of the annular ridge portion 71 corresponding to one side of the outer region of the bent shape in the bent state may be relatively large, so that the length of the side of the protective sleeve 70 may increase. Therefore, during the increment of the strength of the protective sleeve 70, a stretching degree of the stretching side may be reduced when the protective sleeve 70 is bent. At the same time, the width of the annular ridge portion 71 along the longitudinal direction of the protective sleeve 70 toward the side of the inner region of the bent shape may be relatively small when the protective sleeve 70 is in the bent state, which may increase a space of the compressed annular connection portion 72 in the length direction of the protective sleeve 70, and alleviate the compression of the compressed side.

Further, in an application scenario, the width of the annular ridge portion 71 may gradually decrease from the side of the outer region facing the bent shape to the side of the inner region facing the bent shape. Therefore, the width toward the side of the outer region of the bent shape formed by the protective sleeve 70 may be greater than the width toward the side of the inner region of the bent shape when the protective sleeve 70 is in the bent state.

It should be easily understood that the annular ridge portions 71 are disposed around the periphery of the protective sleeve 70. In the length direction of the protective sleeve 70, one side may correspond to the stretched side, and the other side may correspond to the compressed side. In the embodiment, the width of the annular ridge portion 71 may gradually decrease from the side of the outer region facing the bent shape to the side of the inner region facing the bent shape, so that the width may be more uniform, which may improve the stability of the protective sleeve 70.

In one embodiment, the annular ridge portion 71 may include a groove 711 on an inner ring surface inside the protective sleeve 70 at the side of the outer region of the bent shape formed by the protective sleeve 70 when the protective sleeve 70 is in the bent state.

Specifically, the groove 711 in the embodiment may be disposed along a direction perpendicular to the length direction of the protective sleeve 70. Therefore, the corresponding annular ridge portion 71 may be appropriately extended in the length direction when the protective sleeve 70 is stretched.

As described above, when the protective sleeve 70 is in the bent state, the protective sleeve 70 facing the outer side of the bent shape formed by the protective sleeve 70 may be in the stretched state. In the embodiment, the groove 711 may be further disposed on the inner ring surface inside the protective sleeve 70 corresponding to the corresponding annular ridge portion 71. Therefore, the annular ridge portion 71 corresponding to the groove 711 may be appropriately extended to bear a portion of the stretch when the protective sleeve is stretched at the side, thereby reducing a tensile force experienced by the protective sleeve at the side, and protecting the protective sleeve 70.

It should be noted that the inner wall of the protective sleeve 70 corresponding to the annular ridge portion 71 at the side facing the inner region of the bent shape may not include the groove 711 when the protective sleeve 70 is in the bent state. In an embodiment, the width of the groove 71 along the length of the protective sleeve 70 may gradually decrease from the side of the outer region facing the bent shape to the side of the inner region facing the bent shape. Therefore, no groove 711 may be disposed on the inner side wall of the protective sleeve 70 corresponding to the annular ridge portion 71 facing the inner region side of the bent shape.

Specifically, when the hinge component 122 in the embodiment is applied to the glasses in the embodiment of the present disclosure described above, the protective sleeve 70 may be disposed on the main bodies 121 of the glasses temples at both sides in the length direction of the protective sleeve 70, respectively, and connected to the function member 20. In an application scenario, the protective sleeve 70 may also be integrally formed as other structures of the glasses, such as protective covers of some components, so that the glasses may be more sealed and integrated.

It should be noted that the hinge component 122 in the embodiment of the present disclosure may not only be used in the glasses in the embodiment of the present disclosure, but also be used in other devices. Moreover, the hinge component 122 may also include other components related to the hinge 30 other than the rod-shaped member 40, the fixing member 50, the connection wire 60, the protective sleeve 70, etc. to achieve corresponding functions.

Figure 10:
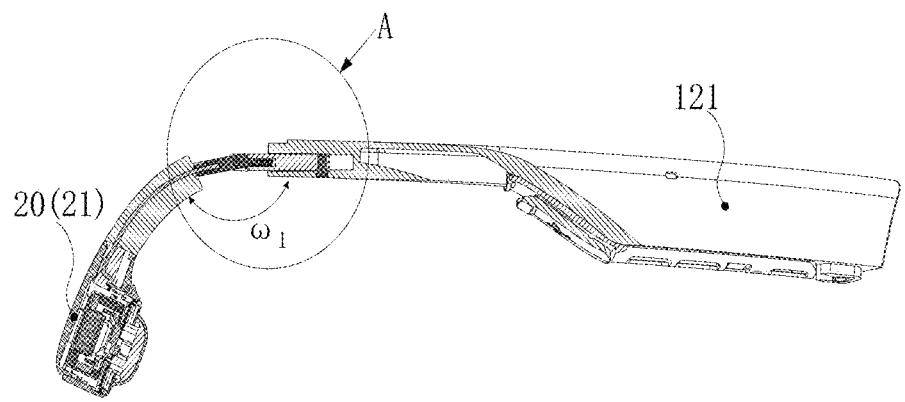
FIG. 10 illustrates a partial sectional view of glasses according to some embodiments of the present disclosure.
Figure 11:
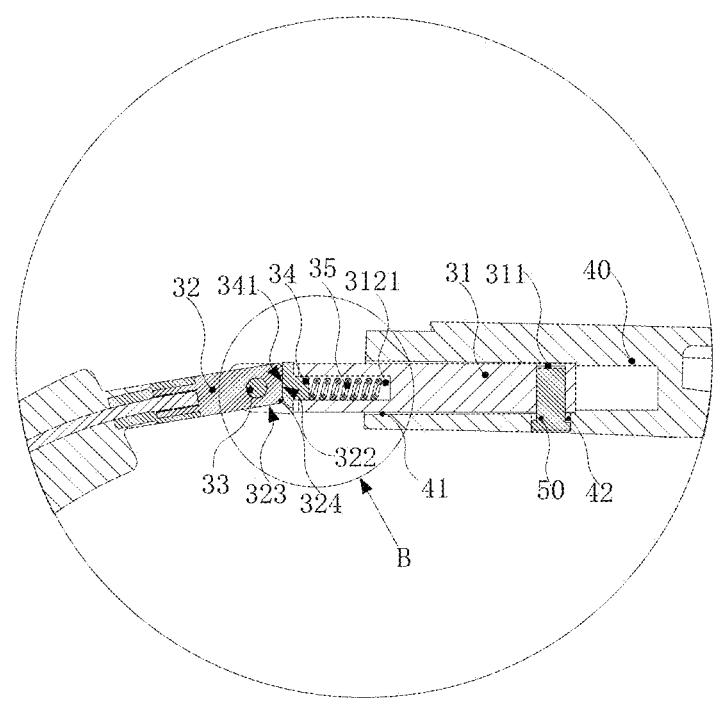
FIG. 11 illustrates an enlarged view of part A in FIG. 10 according to some embodiments of the present disclosure.
Figure 12:
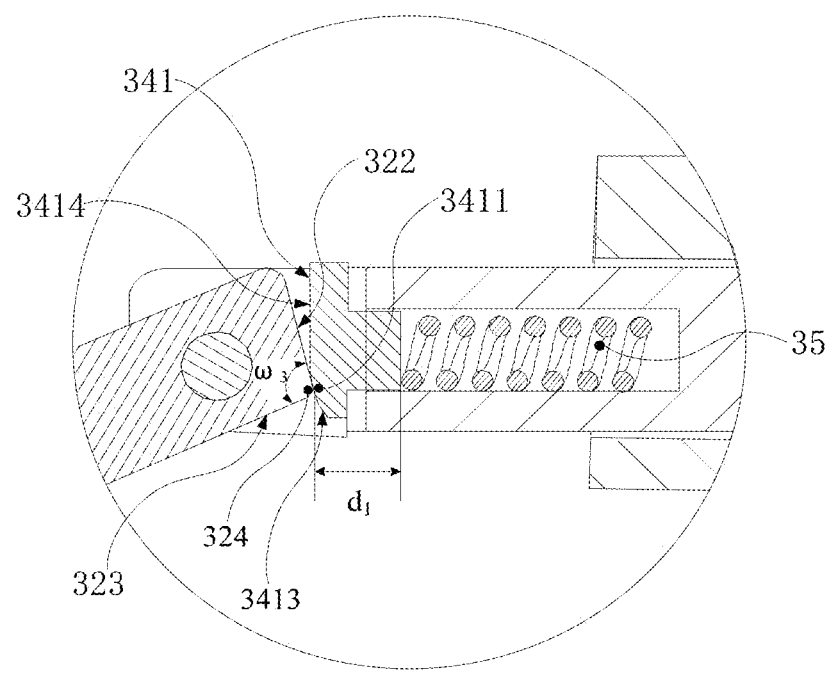
FIG. 12 illustrates an enlarged view of part B in FIG. 11 according to some embodiments of the present disclosure.
Figure 13:
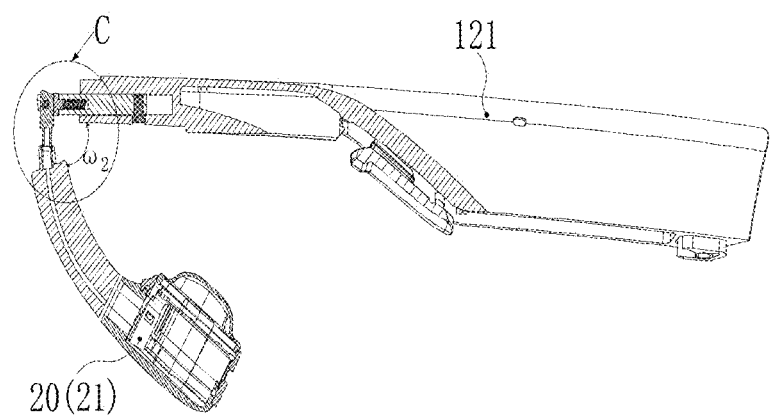
FIG. 13 illustrates a partial sectional view of glasses according to some embodiments of the present disclosure.
Figure 14:
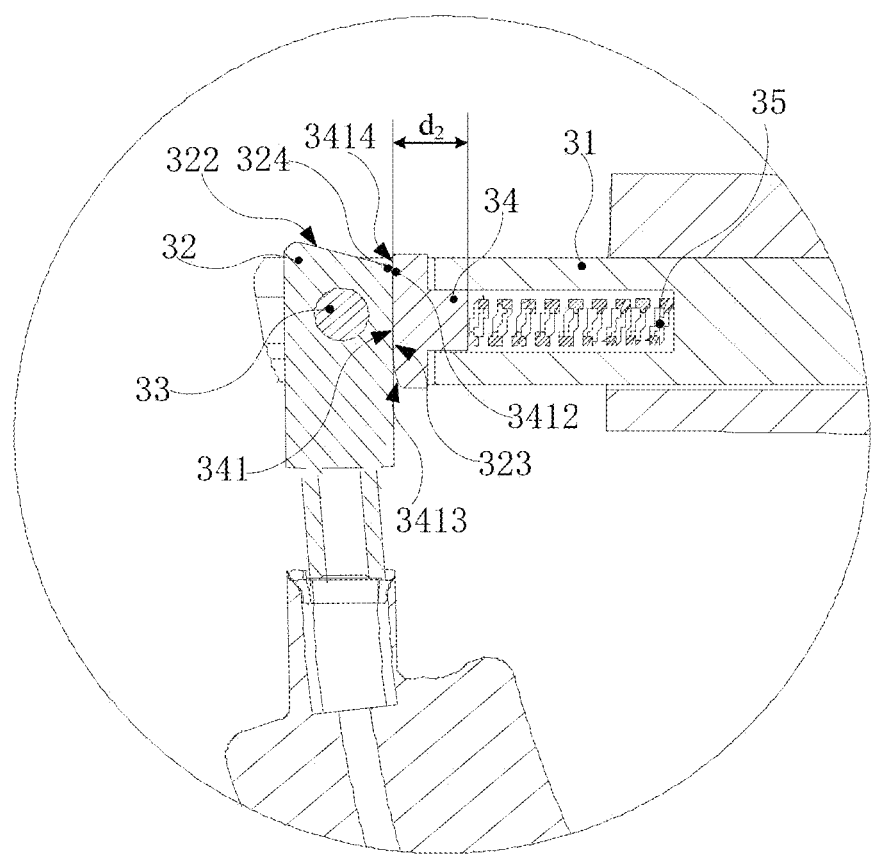
FIG. 14 illustrates an enlarged view of part C in FIG. 13 according to some embodiments of the present disclosure.

Specifically, referring to FIG. 10 to FIG. 14 together, FIG. 10 illustrates a partial sectional view of a hinge according to an embodiment of the present disclosure. FIG. 11 illustrates an enlarged view of part A in FIG. 10 according to some embodiments of the present disclosure. FIG. 12 illustrates an enlarged view of part B in FIG. 11 according to some embodiments of the present disclosure. Specifically, FIG. 12 illustrates an enlarged view of part B in FIG. 11 when the abutting between a first support surface and a third support surface is changed to the abutting between a second support surface and the third support surface. Therefore, a connection between the first support surface and the second support surface initially touches the third support surface. FIG. 13 illustrates a partial sectional view of a hinge according to an embodiment of the present disclosure. FIG. 14 illustrates an enlarged view of part C in FIG. 13 according to some embodiments of the present disclosure. It should be noted that the hinge 30 in the embodiment of the present disclosure may be used in the glasses in the embodiment of the present disclosure. The hinge 30 may be used in the hinge component 122 in the embodiments of the present disclosure, or used in other devices, and be not specifically limited herein.

In the embodiment, the hinge arm 32 of the hinge 30 may have a first support surface 322 and a second support surface 323 connected to each other.

The hinge 30 may also include a support member 34 and an elastic member 35. The support member 34 may be flexibly disposed on the hinge mount 31 and have a third support surface 341. The elastic member 35 may be used to elastically offset the support member 34 toward the hinge arm 32, so that the third support surface 341 may elastically abut on the first support surface 322 and the second support surface 323, respectively.

In some embodiments, when the hinge arm 32 rotates relative to the hinge mount 31 due to an external force, a connection 324 of the first support surface 322 and the second support surface 323 may drive the support member 34 against the elastic offset of the elastic member 35 to move in the opposite direction. Therefore, the third support surface 341 may be switched from elastically abutting on one of the first support surface 322 and the second support surface 323 to elastically abutting on the other of the first support surface 322 and the second support surface 323.

In an application scenario, the support member 34 may be connected to an end of the elastic member 35 facing the hinge arm 32. The third support surface 341 may face the side toward the hinge arm 32. In the process that the hinge arm 32 rotates relative to the hinge mount 31 around the rotating shaft 33 due to the external force, the third support surface 341 may be pushed so that the support member 34 may compress the elastic member 35. Further, the elastic offset may occur under the action of the elastic member 35. Of course, the elastic member 35 may be disconnected to the support member 34, and only abut on one side of the support member 34 as long as the support member 34 implements the elastic offset.

In some embodiments, the first support surface 322 and the second support surface 323 may be two side surfaces adjacent to the hinge arm 32. At least part of the first support surface 322 and the second support surface 323 may be parallel to the central axis of the rotating shaft 33, or a portion of the two side surfaces. When the hinge arm 32 rotates relative to the hinge mount 31, the first support surface 322 and the second support surface 323 may rotate with the hinge arm 32 around the rotating shaft 33. Therefore, different side surfaces of the hinge arm 32 may face the hinge mount 31. Thus, the hinge arm 32 may have different positions relative to the hinge mount 31.

In addition, the elastic member 35 may be a member that may provide an elastic force and be compressed in an elastic direction to provide a compression space. For example, the elastic member 35 may include a spring. One end of the spring may abut on the support member 34. When the third support surface 341 of support member 34 is pushed toward the elastic member 35, the elastic member 35 may be against the support member 34 and be compressed to provide a space in a direction that the third support surface 341 of the support member 34 faces. Therefore, when a relative position of the rotating shaft 33 is unchanged, there may be still enough space for different sides of the hinge arm 32 to rotate between the rotating shaft 33 and the third support surface 341.

Specifically, when the hinge arm 32 rotates relative to the hinge mount 31, the relative position of the rotating shaft 33 may be unchanged. A contact position of the hinge arm 32 and the third support surface 341 of the hinge mount 31 may change. Since distances between different positions of the hinge arm 32 and the rotating shaft 33 are different, the required space between the rotating shaft 33 and the contact position of the hinge arm 32 and the third support surface 341 may be different when different positions of the hinge arm 32 (e.g., different positions of the first support surface 322 and the second support surface 323) contact the third support surface 341. Due to the limitation of the elastic force and the space, the space provided by the compression of the elastic member 35 may be limited. Therefore, during the rotation of the hinge arm 32 relative to the hinge mount 31, if a distance between a position of the hinge arm 32 and the rotating shaft 33 is too large in a section perpendicular to the central axis of the rotating shaft 33, the position may be locked at another position of the third support surface during the rotation process, so that the hinge arm 32 may not continue to rotate. Therefore, the hinge arm 32 and the hinge mount 31 only rotates relatively within a range. In an application scenario, during the relative rotation between the hinge arm 32 and the hinge mount 31 around the rotating shaft 33, only the first support surface 322, the second support surface 323, and a region corresponding to the connection 324 between the first support surface 322 and the second support surface 323 may abut on the third support surface 341.

Further, in the embodiment, the first support surface 322 and the second support surface 323 may both be planes. A distance from the rotating shaft 33 to the connection 324 of the two support surfaces may be greater than a distance from the rotating shaft 33 to the first support surface 322 and a distance to the second support surface 323. The hinge 30 may have two relatively stable states that the third support surface 341 abuts on the first support surface 322 and the third support surface 341 abuts on the second support surface 323.

Of course, in the embodiment, the first support surface 322 and the second support surface 323 may also be curved surfaces with a radian or even include different sub-support surfaces, as long as a positional relationship between the hinge arm 32 and the hinge mount 31 may have at least two corresponding relatively stable states, and be not specifically limited herein. In addition, the hinge arm 32 may include more support surfaces. The hinge arm 32 and the hinge mount 31 may have various relative positional relationships by the different support surfaces elastically abutting on the third support surface 341 when the hinge arm 32 rotates relative to the hinge mount 31 around the rotating shaft 33 due to an external force, and be not specifically limited herein.

Specifically, as shown in FIG. 11 and FIG. 12, an original state that the first support surface 322 abuts on the third support surface 341 of the support member 34 may be taken as an example. At this time, the elastic member 35 may have an elastic compression deformation, or be in an original natural state, and be not limited herein. When the hinge arm 32 rotates relative to the hinge mount 31 around the rotating shaft 33 due to an external force of the hinge 30. Therefore, the second support surface 323 gradually approaches the third support surface 341, the connection 324 between the first support surface 322 and the second support surface 323 may touch the third support surface 341. Since the distance from the connection 324 to the rotating shaft 33 may be greater than the distance from the first support surface 322 to the rotating shaft 33, the connection 324 may abut on the support member 34 and push the support member 34 to move toward the elastic member 35, thereby allowing the elastic member 35 against the pull to compress. When the hinge arm 32 is further stressed, the connection 324 may gradually approach a region between the rotating shaft 33 and the third support surface 341. In the process, the distance between the rotating shaft 33 and the third support surface 341 may gradually increase. It should be easily understood when a connection line between the connection 324 and the rotating shaft 33 is perpendicular to the third support surface 341, the distance from the rotating shaft 33 to the third support surface 341 may be equal to the distance from the rotating shaft 33 to the connection 324 in a section perpendicular to the central axis of the rotating shaft 33. At this time, the rotating shaft 33 may be farthest from the third support surface 341. At this time, if the force is continuously applied to the hinge 30, the distance from the rotating shaft 33 to the third support surface 341 may gradually decrease, so that the required compression space of the elastic member 35 may be reduced. Then the elastic member 35 may gradually release the elastic force and recover until the connection 324 leaves the third support surface 341 and the second support surface 323 abuts on the third support surface 341, thereby switching from abutting the first support surface 322 on the third support surface 341 to abutting the second support surface 323 on the third support surface 341.

Similarly, the process (as shown in FIG. 13 and FIG. 14) for switching from an original state that the second support surface 323 abuts on the third support surface 341 of the support member 34 to a state that the first support surface 322 abuts on the third support surface 341 of the support member 34 may be similar to the above process.

It should be noted that the hinge 30 in the embodiment may be applied to the hinge component 122 of the glasses in the embodiment of the present disclosure. When the third support surface 341 is switched from elastically abutting on one of the first support surface 322 and the second support surface 323 to elastically abutting on the other of the first support surface 322 and the second support surface 323, the hinge component 122 may drive the speaker 21 to switch between a first relatively fixing position and a second relatively fixing position relative to the main body 121 of the glasses temple. The hinge component 122 may fit on the back of an auricle of the user when the speaker 21 is in the first relatively fixing position. As used herein, the auricle may be a portion of an external ear and mainly composed of cartilage. In some embodiments, the speaker 21 may include a bone conduction speaker. By fitting the speaker to the back of the auricle, the cartilage of the auricle may be used to transmit bone conduction sound/vibration. The bone conduction speaker may be fitted to the back of the auricle, thereby improving the sound quality and reducing the impact on an ear canal during the sound transmission.

It should be noted that the distance from the rotating shaft 33 to the connection 324 may be greater than a vertical distance from the first support surface 322 and the second support surface 323. Therefore, in the process that the third support surface 341 is switched from elastically abutting on one of the first support surface 322 and the second support surface 323 to elastically abutting on the other of the first support surface 322 and the second support surface 323, the state of the hinge 30 may change abruptly.

The switch from elastically abutting between the first support surface 322 and the third support surface 341 to elastically abutting between the second support surface 323 and the third support surface 341 may be taken as an example. When a ratio of the maximum distance $h_1$ between the rotating shaft 33 and the connection 324 to the shortest distance $h_2$ between the rotating shaft 33 and the first support surface 322 is different, the change during the switching process may be different.

In one embodiment, in the section perpendicular to the central axis of the rotating shaft 33, the ratio of the maximum distance h1 between the rotating shaft 33 and the connection 324 to the shortest distance $h_2$ between the rotating shaft 33 and the first support surface 322 may be in a range from 1.1 to 1.5.

Specifically, the maximum distance $h_1$ from the rotating shaft 33 to the connection 324 may be larger than the shortest distance $h_2$ of the rotating shaft 33 to the first support surface 322 by disposing the rotating shaft 33 away from the second support surface 323 and close to the side of the hinge arm 32 opposite to the second support surface 323, thereby satisfying the ratio described above.

It should be noted that the change may become obvious when the ratio of $h_1$ to $h_2$ is too large. However, a large force may be needed to switch from elastically abutting between the first support surface 322 and the third support surface 341 to elastically abutting between the second support surface 323 and the third support surface 341, thereby causing inconvenience. If the ratio of $h_1$ to $h_2$ is too small, although it is easier to switch the state, the change may be small. For example, when the user pulls the hinge 30, there may be no obvious handle sense, causing inconvenience. In the embodiment, the ratio of $h_1$ to $h_2$ may be set between 1.1 and 1.5, and the hinge 30 may have a more obvious change when the third support surface 341 is switched from elastically abutting on the first support surface 322 to elastically abutting on the second support surface 323. Thus, during use, the user may have a relatively obvious handle sense of pulling the hinge 30. At the same time, the change may not be too abrupt to making it difficult for the user to switch the state of the hinge 30.

In an application scenario, the ratio of $h_1$ to $h_2$ may also be between 1.2 and 1.4. Specifically, the ratio of h to $h_2$ may also be 1.1, 1.2, 1.3, 1.4, 1.5, etc., and be not specifically limited herein.

In addition, the positions of the first support surface 322 and the second support surface 323 set on the hinge arm 32 may affect the included angle between the hinge arm 32 and the hinge mount 31 when the third support surface 341 abuts on one of the first support surface 322 and the second support surface 323. Therefore, the positions of the first support surface 322 and the second support surface 323 on the hinge arm 32 may be set differently according to specific user requirements. In some embodiments, the included angle between the hinge arm 32 and the hinge mount 31 may be specifically shown in FIG. 9 and FIG. 12. ω1 may be the included angle between the hinge arm 32 and the hinge mount 31 when the third support surface 341 abuts on the first support surface 322. ω2 may be the included angle between the hinge arm 32 and the hinge mount 31 when the third support surface 341 abuts on the second support surface 323. In one embodiment, each of the hinge arm 32 and the hinge mount 31 may have a length. The hinge arm 32 may be disposed on one end side of the hinge mount 31 in the length direction. The first support surface 322 may be disposed at the end of the hinge arm 32 near the hinge mount 31 in the length direction. The second support surface 323 may be disposed at one end in the width direction of the hinge arm 32 and parallel to the central axis of the rotating shaft 33. At this time, when the third support surface 341 elastically abuts on the first support surface 322, the included angle between the hinge arm 32 and the hinge mount 31 may be the largest. When the third support surface 341 elastically abuts on the second support surface 323, the included angle between the hinge arm 32 and the hinge mount 31 may be the smallest. Therefore, the included angle between the hinge mount 31 and the hinge arm 32 may be changed from ω1 to ω2 and decrease when the third support surface 341 is switched from elastically abutting on the first support surface 322 to elastically abutting on the second support surface 323.

It should be further noted if the direction of the force applied to the hinge arm 32 is the same as the direction of the gravity of the hinge arm 32 when the third support surface 341 is switched from elastically abutting on the first support surface 322 to elastically abutting on the second support surface 323, the switching in this state may make the included angle between the hinge mount 31 and the hinge arm 32 smaller. The setting of the ratio of $h_1$ to $h_2$ in the embodiment may also make the hinge arm 32 not or hardly reduce the angle between the hinge arm 32 and the hinge mount 31 spontaneously due to the own gravity when the third support surface 341 elastically abut on the first support surface 322.

In an embodiment of a hinge in the present disclosure, referring to FIG. 12, the included angle ω3 between the first support surface 322 and the second support surface 323 may be an obtuse angle in a section perpendicular to the central axis of the rotating shaft 33.

In some embodiments, when the hinge 30 switches from the state of elastically abutting between the first support surface 322 and the third support surface 341 to the state of elastically abutting between the second support surface 323 and the third support surface 341, the smaller the included angle ω3 between the first support surface 322 and the second support surface 323, the larger the relative rotation angle between the hinge mount 31 and the hinge arm 32 may be when the state is switched. That is, when the hinge mount 31 is fixed, the user may need to move the hinge arm 32 to a larger angle to switch the state of the hinge 30, so that the user may be laborious and it may bring inconvenience to the user.

Since the hinge arm 32 has a length, and the first support surface 322 is disposed at one end in the length direction of the hinge arm 32, the second support surface 323 may be disposed adjacent to the first support surface 322 in the width direction of the hinge arm 32. Normally, the first support surface 322 and the second support surface 323 may be arranged vertically. At this time, when the hinge 30 is switched between the two states, the hinge arm 32 and the hinge mount 31 may need to be moved relative to each other by 90 degrees.

In the embodiment, in the section perpendicular to the central axis of the rotating shaft 33, the included angle ω3 between the first support surface 322 and the second support surface 323 may be an obtuse angle. Thus, the angle required for the relative movement of the hinge arm 32 and the hinge mount 31 may be less than 90 degrees when the hinge 30 switches between the two states, which may facilitate the user.

Specifically, when the hinge 30 in the embodiment is used in the embodiment of the glasses in the present disclosure, the hinge 30 may be used to connect the main body 121 of the glasses temple and the speaker 21. In some embodiments, the speaker 21 may be a bone conduction speaker. For example, when the hinge 30 is in a second state of elastically abutting between the second support surface 323 and the third support surface 341, the speaker 21 may be in the first relatively fixing position to fit the back of the auricle of the user. Therefore, when the user needs to use the function of the speaker 21 of the glasses, the user may only need to rotate the speaker 21 by an angle less than 90 degrees to fit it to the back of the auricle of the user. In addition, when the hinge 30 is in a first state of elastically abutting between the first support surface 322 and the third support surface 341, the hinge arm 32 and the connected speaker 21 may form an angle. Therefore, the hinge arm 32 and the connected speaker 21 may be located behind an ear of the user and face the direction of the ear of the user when the user wears the glasses. Therefore, the glasses may be blocked and fixed, and prevented from falling off the head of the user.

It should be noted that the included angle ω3 between the first support surface 322 and the second support surface 323 may be set according to actual requirements. If the included angle is too large, the included angle between the hinge arm 32 and the hinge mount 31 and the angle between the function member 20 connected to the end of the hinge arm 32 away from the hinge mount 31 and the hinge mount 31 may be smaller. Therefore, the hinge arm 32 and the function member 20 may be too close to the ears of the user to compress the ears when the user wears it, reducing the comfort of the user. If the included angle is too small, on the one hand, the required angle may be too large, which is inconvenient for the user when the user moves the speaker 21 to switch between the first relative position and the second relative position. On the other hand, the included angle between the main body 121 of the glasses temple and the hinge 30 and the included angle between the main body 121 of the glasses temple and the speaker 21 may be too small to play a role in blocking and fixing the glasses. Therefore, the glasses may be easily dropped from the front side of the head of the user when the user wears the glasses. Specifically, the included angle between the first support surface 322 and the second support surface 323 may be set according to the shape of the head of the user.

Specifically, in an application scenario, in the section perpendicular to the central axis of the rotating shaft 33, the included angle ω3 between the first support surface 322 and the second support surface 323 may be between 100 degrees and 120 degrees, and specifically be 100 degrees, 110 degrees, 120 degrees, or the like. The setting of the angle may enable the user to wear the glasses, and the speaker 21 may not be too close to the ears of the user to cause discomfort to the ears of the user when the speaker 21 is in the first relatively fixing position. It may be unnecessary to rotate the hinge by an excessive angle upon switching between the two relative positions of the speaker 21, which is convenient for users.

In some embodiments, in the process that the third support surface 341 is switched from elastically abutting on one of the first support surface 322 and the second support surface 323 to elastically abutting on the other of the first support surface 322 and the second support surface 323, the connection 324 between the first support surface 322 and the second support surface 323 may abut on the third support surface 341, and drive the support member 34 against the elastic offset of the elastic member 35 to move in the opposite direction. Elastically abutting between the third support surface 341 and the first support surface 322 before the switching may be taken as an example. At the start of the switching, while the first support surface 322 gradually moves away from the third support surface 341, the connection 324 may gradually abut on the third support surface 341 and slide from one side of the third support surface 341 to another side of the third support surface 341 during the switching process. Finally, the second support surface 323 and the third support surface 341 may further turn to elastically abut. During the state switching process, the connection 324 may always abut on and interact with the third support surface 341. The shape of the connection 324 may have an effect on the state switching process. For example, if the first support surface 322 and the second support surface 323 are line-connected, the connection 324 may have a relatively sharp angle. Therefore, during the user pulls the hinge mount 31 and/or the hinge arm 32 to switch the state of the hinge 30, on the one hand, the buffer may be small and the switching may be abrupt upon switching from abutting between the connection 324 and the third support surface 341 to abutting between the connection 324 and the first support surface 322 and the second support surface 323. The user may feel poor when pulling the hinge 30. On the other hand, the connection 324 may be relatively sharp, which may cause wear to the third support surface 341 during repeated switching processes.

In one embodiment of the present disclosure, in a section perpendicular to the central axis of the rotating shaft 33, the connection 324 may have a shape of an arc. As a result, the connection between the first support surface 322 and the second support surface 323 may be a connection with an arc surface. During the state switching process of the hinge 30, the connection 324 abutting on the third support surface 341 may be relatively smooth, so that the user may have a better feel when pulling the hinge 30. The damage to the third support surface 341 may be reduced during repeated switching processes.

Specifically, in one embodiment, the connection 324 may have a shape of a circular arc. If a curvature of the arc is different, effects brought by the curvatures may be different. The curvature may be set in combination with actual use situations. The curvature of the arc in the embodiment may be between 5 and 30, and specifically 5, 10, 15, 20, 25, 30, etc., and be not limited herein.

It should be noted when the hinge 30 in the embodiment is applied to the glasses in the embodiment described above, the circular arc shape of the curvature of the connection 324 may enable the user to have a better feel when the hinge 30 is pulled to drive the speaker to switch between the first relatively fixing position and the second relatively fixing position.

In one embodiment, the third support surface 341 may be set so that the external force required when the third support surface 341 is switched from elastically abutting on the first support surface 322 to elastically abutting on the second support surface 323 may be different from the external force required when the third support surface 341 is switched from elastically abutting on the second support surface 323 to elastically abutting on the first support surface 322.

It should be noted that, in a specific use scenario, different states of the hinge 30 may correspond to different functions of the hinge 30 or structures connected to the hinge 30. Alternatively, due to a setting problem of the position of the hinge 30, it may not be convenient for the user to exert a force to switch from one state to another. When the user switches the state of the hinge 30, it may be necessary to distinguish the strength of pulling the hinge 30 to facilitate the user to exert the force, or to provide the user with an intuitive experience to distinguish the two hinge states.

Specifically, when the hinge 30 in the embodiment is applied to the glasses, the state switching of the hinge 30 may drive the speaker 21 to switch between the first relatively fixing position and the second relatively fixing position relative to the main body 121 of the glasses temple. Correspondingly, the two relatively fixing positions may correspond to two situations where the user uses the speaker 21 and where the user does not use the speaker 21. When the user wears the glasses, difficulty of applying forces to the back of the head to switch between the two states may be different. Therefore, the design of applying different external forces to correspondingly switching between different states may facilitate the usage of the user.

Specifically, in an embodiment, when the third support surface 341 is switched from elastically abutting on the first support surface 322 to elastically abutting on the second support surface 323, the speaker 21 may move from the second relatively fixing position to the first relatively fixing position so as to fit the back of the auricle of the user.

Further, in the embodiment, the third support surface 341 may be set such that the external force required when the third support surface 341 is switched from elastically abutting on the first support surface 322 to elastically abutting on the second support surface 323 may be less than the external force required when the third support surface 341 is switched from elastically abutting on the second support surface 323 to elastically abutting on the first support surface 322.

It should be noted when the speaker 21 is used, the third support surface 341 may need to be switched from elastically abutting on the first support surface 322 to elastically abutting on the second support surface 323 upon being applied to the glasses. When the speaker 21 is not used, the third support surface 341 may need to be switched from elastically abutting on the second support surface 323 to elastically abutting on the third support surface 341. According to the embodiment, the force required when the user uses the speaker 21 may be less than the force required when the speaker 21 is not used. Therefore, it may be convenient for the user to use the function of the speaker 21 of the glasses.

Specifically, referring to FIG. 12 and FIG. 14 together, in an application scenario, when the third support surface 341 is switched from elastically abutting on the first support surface 322 to elastically abutting on the second support surface 323, the connection 324 may initially contact a first position 3411 of the third support surface 341. When the third support surface 341 is switched from t elastically abutting on the second support surface 323 to elastically abutting on the first support surface 322, the connection 324 may initially contact a second position 3412 of the third support surface 341. In some embodiments, in a section perpendicular to the central axis of the rotating shaft 33, a distance d1 between the first position 3411 and a contact point of the elastic member 35 and the support member 34 along the direction of the elastic offset of the elastic member 35 may be less than a distance d2 between the second position 3412 and the contact point in the direction of the elastic offset.

It should be noted when the third support surface 341 elastically abuts on the first support surface 322, the connection 324 may be located near a position of one end of the third support surface 341. When the third support surface 341 elastically abuts on the second support surface 323, the connection 324 may be located near a position of another end of the third support surface 341. Therefore, the first position 3411 and the second position 3412 may be located near the two ends of the third support surface 341, respectively. That is, in the embodiment, a distance between the positions of the third support surface 341 of the support member 34 near the two ends may be different from a distance between the elastic member 35 and the contact point of the support member 34 in the direction of the elastic offset of the elastic member 35. The distance corresponding to the second position 3412 may be less than the distance corresponding to the first position 3411. At this time, when the third support surface 341 is switched from elastically abutting on the first support surface 322 to elastically abutting on the second support surface 323, the connection 324 may not immediately abut on the third support surface 341 and receive a reaction force of the elastic member 35, but gradually abut on the third support surface 341 and receive the reaction force of the elastic member 35 during the switching process. When the third support surface 341 is switched from elastically abutting on the first support surface 322 to elastically abutting on the second support surface 323, the connection 324 may initially abut on the third support surface 341 and receive the reaction force of elastic member 35, or at least receive the reaction force of elastic member 35 earlier than that the third support surface 341 is switched from elastically abutting on the second support surface 323 to elastically abutting on the first support surface 322. Therefore, in this case, the hinge 30 may need a smaller force to switch from elastically abutting on the first support surface 322 to elastically abutting on the second support surface 323. Therefore, the force required to move the speaker 21 may be small when the user uses the speaker 21, which is convenient for the user.

Further, the third support surface 341 may include a first sub-support surface 3413 and a second sub-support surface 3414. In some embodiments, the first position 3411 may be disposed on the first sub-support surface 3413. The second position 3412 may be disposed on the second sub-support surface 3414. That is, the first sub-support surface 3413 and the second sub-support surface 3414 may be disposed near the two ends of the third support surface 341, respectively.

In some embodiments, the second sub-support surface 3414 may be a plane. Specifically, when the first support surface 322 or the second support surface 323 elastically abuts on the third support surface 341, the second sub-support surface 3414 may be parallel to the first support surface 322 or the second support surface 323. The first sub-support surface 3413 may be a flat surface or a curved surface, and be not limited herein.

Further, the first sub-support surface 3413 and the second sub-support surface 3414 may not be located in the same plane. The first sub-support surface 3413 may be inclined relative to the second sub-support surface 3414. An included angle between the two sub-support surfaces may be no greater than 10 degrees, for example, no greater than 2 degrees, 4 degrees, 6 degrees, 8 degrees, 10 degrees, etc. Specifically, the first sub-support surface 3413 may be disposed in a direction away from the hinge arm 32. Therefore, in the section perpendicular to the central axis of the rotating shaft 33, the distance between the first position 3411 and the elastic member 35 and the distance between the first position 3411 and the contact point of the elastic member 35 in the direction of the elastic offset of the elastic member 35 may be less than the distance between the second position 3412 and the contact point in the direction of the elastic offset. In some embodiments, when the first sub-support surface 3413 is a curved surface and the second sub-support surface 3414 is a flat surface, the included angle between the first sub support surface 3413 and the second sub-support surface 3414 may be an included angle between a plane tangent to the first sub support surface 3413 and the second sub support surface 3414 at the intersection of the two sub-support surfaces.

Figure 15:
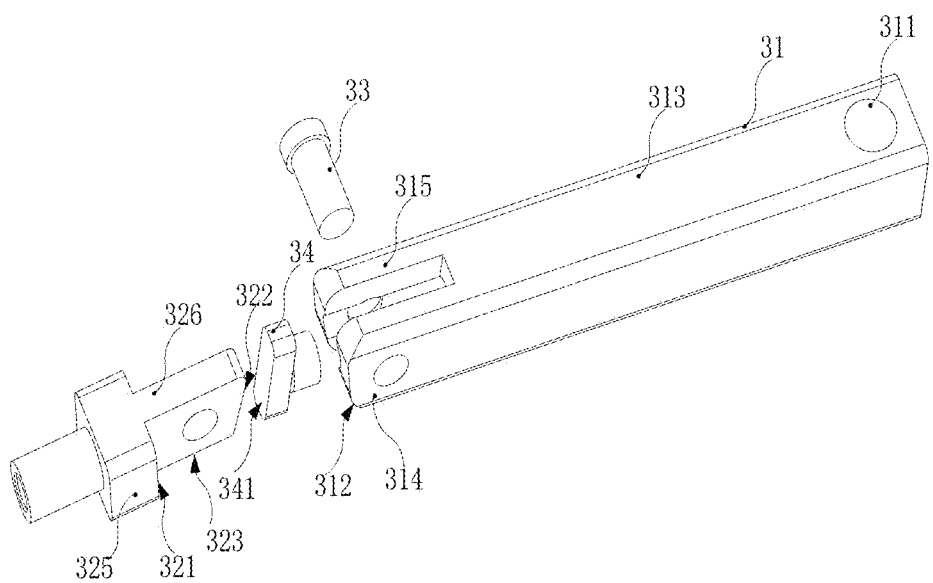
FIG. 15 is an exploded structural diagram illustrating glasses according to some embodiments of the present disclosure.

Referring to FIG. 15, FIG. 15 is an exploded structural diagram illustrating a hinge according to an embodiment of the present disclosure. In the embodiment, the hinge mount 31 may include a mount body 313, a first lug 314 and a second lug 315. The first lug 314 and the second lug 315 may be protruding from the mount body 313 and spaced from each other. The hinge arm 32 may include an arm body 325 and a third lug 326 protruding from the arm body 325. The third lug 326 may be inserted into an interval region between the first lug 314 and the second lug 315, and rotatably connected to the first lug 314 and the second lug 315 via the rotating shaft 33. The first support surface 322 and the second support surface 323 may be disposed on the third lug 326. At least part of the support member 34 may be disposed in the interval region and located at the side of the third lug 326 facing the mount body 313. The mount body 313 may include an accommodation chamber 3121 communicating with the interval region. The elastic member 35 may be disposed inside the accommodation chamber 3121, and allow the support member 34 elastically offset facing the third lug 326.

Specifically, corresponding positions of the first lug 314, the second lug 315, and the third lug 326 may respectively include a first through-hole, a second through-hole, and a third through-hole located in a same axial direction. Inner diameters of the three through-holes may be no less than the outer diameter of the rotating shaft 33. Thus, when the rotating shaft 33 passes through a corresponding through-hole, the hinge mount 31 where the first lug 314 and the second lug 315 are located may be rotatably connected to the hinge arm 32 where the third lug 326 is located.

In some embodiments, the first support surface 322 and the second support surface 323 may be both disposed on the third lug 326 and parallel to the central axis of the rotating shaft 33. Therefore, the first support surface 322 and the second support surface 323 may enter the interval region between the first lug 314 and the second lug 315 when the hinge arm 32 rotates around the rotating shaft 33 relative to the hinge mount 31.

Further, the support member 34 may be located between the first lug 314 and the second lug 315 of the mount body 313. The third support surface 341 of the support member 34 may be disposed toward the third lug 326. In one application scenario, the elastic member 35 may be completely set inside the accommodation chamber 3121, and touch the support member 34 at the side facing the interval region between the first lug 314 and the second lug 315. When the elastic member 35 is in a natural state, at least part of a region of the support member 34 near the elastic member 35 may be located inside the accommodation chamber 3121. It should be noted that the shape of the portion of the support member 34 inside the accommodation chamber 3121 may match the shape of the accommodation chamber 3121. Therefore, the portion of the support member 34 located inside the accommodation chamber 3121 may stably slide inside the accommodation chamber 3121 when the support member 34 is elastically offset via the elastic member 35.

In an application scenario, a sectional area of the accommodation chamber 3121 may be less than a sectional area of the interval region between the first lug 314 and the second lug 315 in a section perpendicular to the length direction of the hinge mount 31. The shape of the support member 34 region outside the accommodation chamber 3121 may match the interval region. Therefore, the support member 34 may not all enter the accommodation chamber 3121 upon moving toward a side of the elastic member 35.

Of course, in other embodiments, the sectional shape of the accommodation chamber 3121 may be the same as the interval region between the first lug 314 and the second lug 315 in the section perpendicular to the length direction of the hinge mount 31. At this time, the support member 34 may completely enter the accommodation chamber 3121. Therefore, the support member 34 may slide inside the entire accommodation chamber 3121 upon receiving a pushing force.

Further, when the hinge 30 in the embodiment is applied to the hinge component 122 in the embodiment of the hinge component in present disclosure, the first end surface 312 of the hinge mount 31 may be an end surface of the first lug 314 and the second lug 315 toward the hinge arm 32. The third lug 326 facing a protrusion toward the arm body 325 may be located inside the interval region between the first lug 314 and the second lug 315. Therefore, the first end surface 312 of the first lug 314 and the second lug 315 may be disposed toward the arm body 325. In a section of the central axis direction of the rotating shaft 33, the arm body 325 may be further protruded from the third lug 326 to form a second end surface 321 of the first lug 314 and the second lug 315 toward the hinge mount 31.

In the embodiment, during the relative rotation of the hinge arm 32 and the hinge mount 31, a gap between the first end surface 312 of the first lug 314 and the second lug 315 and the second end surface 321 of the arm body 325 may always be larger or smaller than the diameter of the connection wire 60. Therefore, the connection wire 60 may not be sandwiched between the first lug 314 and the second lug 315 and the arm body 325 during the relative rotation of the hinge mount 31 and the hinge arm 32, thereby reducing the damage of the connection wire 60 by the hinge 30.

In an application scenario, the gap between the second end surface 321 of the first lug 314 and the second lug 315 and the first end surface 312 of the arm body 325 may always be kept much larger or smaller than the diameter of the connection wire 60 during the relative rotation of the hinge arm 32 and the hinge mount 31, thereby further reducing the damage of the connection wire 60 by the hinge 30.

It should be noted that, in the embodiment, the gap between the first end surface 312 and the second end surface 321 may be a gap with even size, thereby satisfying the above condition of being greater than or less than the diameter of the connection wire 60. Alternatively, in another embodiment, only gaps of positions at both end surfaces close to the connection wire 60 may be greater than or less than the diameter of the connection wire 60. Gaps of other positions at both end surfaces may not need to satisfy the condition.

Specifically, in an application scenario, in a section perpendicular to the central axis of the rotating shaft 33, at least one of an end surface of the first lug 314 and the second lug 315 facing the hinge arm 32 and an end surface of the arm body 325 facing the hinge mount 31 may be in a chamfer setting. Therefore, during the relative rotation of the hinge arm 32 and the hinge mount 31, the positions close to the connection wire 60 may always be kept larger than the diameter of the connection wire 60.

In some embodiments, the chamfer setting may be filleted, or directly chamfered.

In the application scenario, it may be only necessary to chamfer at least one of the end surface of the first lug 314 and the second lug 315 near the connection wire 60 facing the hinge arm 32 and the end surface of the arm body 325 facing the hinge mount 31. Therefore, during the relative rotation of the hinge arm 32 and the hinge mount 31, the connection wire 60 may not be clamped into the gap between the two end surfaces.

The hinge in the embodiment of the present disclosure may be applied to the embodiment of the hinge component in the present disclosure, and not be limited herein. In other embodiments, it may also be applied to other hinge components, or a direct connection of two components that need to be rotatably connected.

It should be noted that the above description of the hinge component of the glasses is only a specific example, and should not be regarded as the only feasible implementation solution. Obviously, for those skilled in the art, after understanding the basic principle of the hinge component of glasses, it may be possible to make various modifications and variations in the form and details of the specific method and operation of implementing the hinge component of the glasses without departing from these principles, but these modifications and variations are still within the scope described above. For example, the sectional shape of the hinge mount 31 and the hinge chamber 41 may be circular, oval, trapezoidal, or the like. All such variations may be within the protection scope of the present disclosure.

In some embodiments, the function member of the glasses may include the speaker 21, such as a bone conduction speaker and an air conduction speaker. As used herein, bone conduction is a kind of sound conduction mode, which converts the sound into mechanical vibrations with different frequencies and transmits sound waves through human skull, bone labyrinth, inner ear lymphatic transmission, organum spirale, auditory nerve, auditory center, etc. In some embodiments, the speaker 21 may include earphones, MP3 players, hearing aids, etc.

In typical cases, the sound quality of the speaker 21 may be affected by various factors such as the physical properties of components of the speaker 21, vibration transmission relationship(s) between the components, a vibration transmission relationship between the speaker 21 and the outside, and the efficiency of a vibration transmission system when vibration is transmitted. The components of the speaker 21 may include a component that generates the vibration (e.g., but is not limited to a transducing device), a component that fixes the speaker 21 (e.g., but is not limited to an earphone frame or an earphone hook), and a component that transmits the vibration (e.g., but is not limited to a panel, a vibration transmission layer, etc.). The vibration transmission relationship(s) between the components and the vibration transmission relationship between the speaker and the outside may be determined by a contact mode (e.g., but is not limited to, a clamping force, a contact area, a contact shape, etc.) between the speaker 21 and the user.

Figure 16:
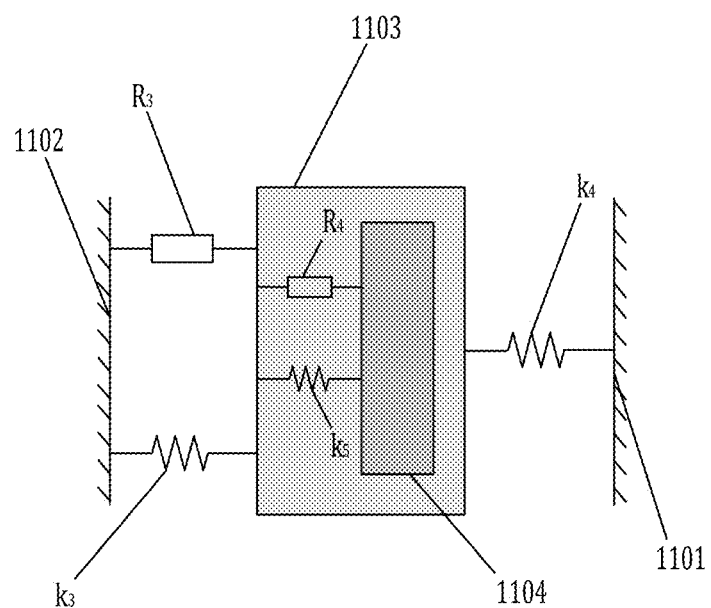
FIG. 16 is an equivalent model illustrating a vibration generation and transmission system of a speaker according to some embodiments of the present disclosure.

For the purpose of illustration only, relationship(s) between the sound quality and the components of the speaker 21 may be further described below based on the speaker 21 transmitting sound by bone conduction. It may need to be known that the contents described below may also be applied to an air conduction speaker without violating the principle. FIG. 16 is an equivalent model illustrating a vibration generation and transmission system of a speaker according to some embodiments of the present disclosure. As shown in FIG. 16, the speaker 21 may include a fixed end 1101, a sensing terminal 1102, a vibration unit 1103, and a transducing device 1104. As used herein, the fixed end 1101 may be connected to the vibration unit 1103 based on a transmission relationship K1 ($k_4$ in FIG. 16). The sensing terminal 1102 may be connected to the vibration unit 1103 based on a transmission relationship K2 ($R_3$, $k_3$ in FIG. 16). The vibration unit 1103 may be connected to the transducing device 1104 based on a transmission relationship K3 ($R_4$, $k_5$ in FIG. 16).

The vibration unit mentioned herein may be a core housing. The transmission relationships K1, K2, and K3 may be descriptions of functional relationships between corresponding portions of an equivalent system of the speaker (described in detail below). The vibration equation of the equivalent system may be expressed as:

$$m_3 x_3'' + R_3 x_3' - R_4 x_4' + (k_3 + k_4) x_3 + k_5 (x_3 - x_4) = f_3 \quad (1)$$

$$m_4 x_4'' + R_4 x_4'' - k_5 (x_3 - x_4) = f_4 \quad (2)$$

where $m_3$ is an equivalent mass of the vibration unit 1103, $m_4$ is an equivalent mass of the transducing device 1104, $x_3$ is an equivalent displacement of the vibration unit 1103, $x_4$ is an equivalent displacement of the transducing device 1104, $k_3$ is an equivalent elastic coefficient between the sensing terminal 1102 and the vibration unit 1103, $k_4$ is an equivalent elastic coefficient between the fixed end 1101 and the vibration unit 1103, $k_5$ is an equivalent elastic coefficient between the transducing device 1104 and the vibration unit 1103, $R_3$ is an equivalent damping between sensing terminal 1102 and vibration unit 1103, $R_4$ is an equivalent damping between the transducing device 1104 and the vibration unit 1103, and $f_3$ and $f_4$ are interaction forces between the vibration unit 1103 and the transducing device 1104, respectively. An equivalent amplitude $A_3$ of the vibration unit in the system may be:

$$A_3 = -\frac{m_4 \omega^2}{(m_3 \omega^2 + j\omega R_3 - (k_3 + k_4 + k_5))(m_4 \omega^2 + j\omega R_4 - k_5) - k_5(k_5 - j\omega R_4)} \cdot f_0 \quad (3)$$

where $f_0$ denotes a driving force unit, and) denotes a vibration frequency. It may be seen that factors affecting a frequency response of a bone conduction speaker may include a vibration generation portion (e.g., but is not limited to a vibration unit, a transducing device, a housing, and interconnection manners, such as $m_3$, $m_4$, k, $R_4$, etc., in equation (3)), a vibration transmission portion (e.g., but is not limited to, a contact manner with the skin, and properties of a speaker frame/a speaker hook, such as $k_3$, $k_4$, $R_3$, etc., in the equation (3)). The change of structures of the components of the bone conduction speaker and parameters of connections between the components may change the frequency response and sound quality of the bone conduction speaker. For example, the change of a clamping force may be equivalent to changing the size of $k_4$. The change of a bonding manner of glue may be equivalent to changing the size of $R_4$ and $k_5$. The change of the hardness, elasticity, damping, etc., of a relevant material may be equivalent to changing the size of $k_3$ and $R_3$. Each of these may change the frequency response and the sound quality of the speaker 21.

In a specific embodiment, the fixed end 1101 may be points or regions (e.g., the top of an ear hook) relatively fixed in the bone conduction speaker during the vibration. These points or regions may be regarded as the fixed end of the bone conduction speaker during the vibration. The fixed end may constitute a specific component, or a position determined according to the overall structure of the bone conduction speaker. For example, the bone conduction speaker may be hung, bonded, or adsorbed near human ears by a specific device. The structure and shape of the bone conduction speaker 21 may be designed so that a bone conduction part may be attached to the human skin.

The sensing terminal 1102 may be a hearing system for the human body to receive sound signal(s). The vibration unit 1103 may be portions of the bone conduction speaker for protecting, supporting, and connecting the transducing device, including portions that directly or indirectly contact the user, such as a vibration transmission layer or panel (a side of the core housing near the human body) that transmits the vibration to the user, a housing that protects and supports other vibration-generating units, etc. The transducing device 1104 may be a sound vibration generating device, which may be one or more transducing devices discussed above or any combination thereof.

The transmission relationship K1 may connect the fixed end 1101 and the vibration unit 1103, and represent a vibration transmission relationship between a vibration generating portion and the fixed end during the work of the bone conduction speaker. K1 may be determined according to the shape and structure of the bone conduction device. For example, the bone conduction speaker may be fixed to the human head in the form of a U-type earphone frame or an earphone hook, or installed on a helmet, fire mask or other special-purpose masks, glasses, etc. The shapes and structures of different bone conduction speakers may affect the vibration transmission relationship K1. Further, the structure of the speaker 21 may also include physical properties such as composition materials, qualities, etc., of different portions of the bone conduction speaker. The transmission relationship K2 may connect the sensing terminal 402 and the vibration unit 1103.

K2 may be determined according to the composition of the transmission system. The transmission system may include but be not limited to transmitting sound vibration to the hearing system through tissues of the user. For example, when the sound is transmitted to the hearing system through the skin, subcutaneous tissues, bones, etc., the physical properties of different human tissues and their interconnections may affect K2. Further, the vibration unit 1103 may be in contact with the human tissue. In different embodiments, a contact surface on the vibration unit may be a side of a vibration transmission layer or panel. A surface shape, size of the contact surface, and an interaction force with the human tissue may affect the transmission relationship K2.

The transmission relationship K3 between the vibration unit 1103 and the transducing device 1104 may be determined by connection properties inside the vibration generating device of the bone conduction speaker. The transducing device and the vibration unit may be connected in a rigid or elastic manner. Alternatively, the change of a relative position of a connecting piece between the transducing device and the vibration unit may change the transmission device to transmit the vibration to the vibrating unit (in particular, the transmission efficiency of the panel), thereby affecting the transmission relationship K3.

During the use of the bone conduction speaker, the sound generation and transmission process may affect the final sound quality felt by the human body. For example, the above-mentioned fixed end, the human sensing terminal, the vibration unit, the transducing device, and the transmission relationships K1, K2, and K3, etc., may all affect the sound quality of the bone conduction speaker. It should be noted that K1, K2, and K3 are only a representation of the connection modes of different device portions or systems involved in the vibration transmission process, and may include, but be not limited to, a physical connection manner, a force transmission manner, the sound transmission efficiency, or the like.

It should be noted that the above description of the bone conduction speaker is only a specific example, and should not be regarded as the only feasible implementation solution. Obviously, for those skilled in the art, after understanding the basic principle of the bone conduction speaker, it may be possible to make various modifications and changes in the form and details of the specific method and operation of implementing the bone conduction speaker without departing from these principles, but these modifications and changes are still within the scope described above. For example, the above-mentioned K1, K2, and K3 may be simple vibrations or mechanical transmission manners. Or, the above-mentioned K1, K2, and K3 may include a complex nonlinear transmission system. The transmission relationship may be formed by a direct connection of each part or transmitted in a non-contact manner.

Referring to FIG. 16, the transmission relationship K2 between the sensing terminal 1102 and the vibration unit 1103 may also affect the frequency response of the bone conduction system. The sound heard by the human ear depends on energy received by a cochlea. The energy may be affected by different physical quantities during transmission, which may be expressed as the following equation:

$$P = \iint_S \alpha \cdot f(a, R) \cdot L \cdot ds, \quad (4)$$

where P is proportional to the energy received by the cochlea. S is an area that a contact surface 502a contacts with a human face. α is a dimension conversion coefficient. f(a, R) denotes influence of an acceleration a of a point on the contact surface and a degree of tightness R between the contact surface and the skin on an energy transmission. L is an impedance of the transmission of the mechanical wave on any contact point, i.e., a transmission impedance per unit area.

Based on Equation (4), the transmission of sound is affected by the transmission impedance L. Vibration transmission efficiency of the bone conduction system is related to L. A frequency response curve of the bone conduction system may be a superposition of frequency response curves of all points on the contact surface. Factors affecting the impedance may include a size, a shape, a roughness, a force, or a force distribution of the energy transmission area. For example, the sound transmission effect may be changed by changing a structure and a shape of the vibration unit, and then the sound quality of the bone conduction component may be changed. For example, the sound transmission effect may be changed by changing corresponding physical properties of the contact surface of the vibration unit.

Figure 17:
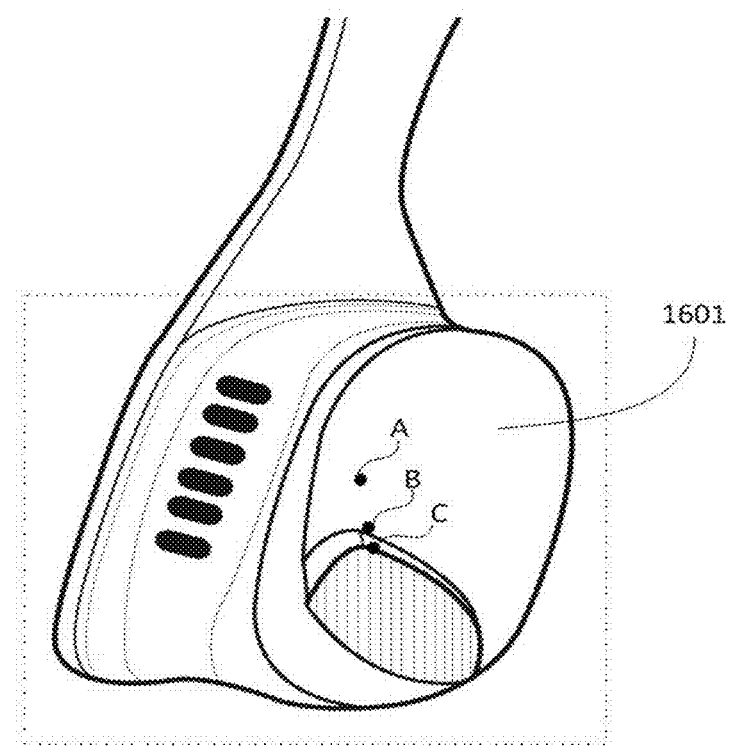
FIG. 17 is a schematic diagram illustrating a contact surface of a vibration unit of a speaker according to an embodiment of the present disclosure.

FIG. 17 is a schematic diagram illustrating a contact surface of a vibration unit of a speaker according to some embodiments of the present disclosure. In some embodiments, the contact surface of the vibration unit of the speaker in FIG. 17 corresponds to the outer wall of the function member 20 in FIG. 1 in contact with the human body. As used herein, the embodiment is a specific embodiment of the transmission relationship K2 between the sensing terminal 1102 and the vibration unit 1103. As shown in FIG. 17, a surface of a well-designed contact surface may be provided with a gradient structure. The gradient structure refers to a region where the surface of the contact surface has a height change. The contact surface mentioned herein is a side close to a user on the core housing. The gradient structure may be a raised/sunken or stepped structure existing on an outside of the contact surface (a side fitted to the user), or a raised/sunken or stepped structure existing on an inside of the contact surface (a side facing away from the user). It should be known that the contact surface of the vibration unit may be fitted to any position of the head of the user, for example, the top of the head, a forehead, a cheek, a temple, an auricle, the back of an auricle, etc. As shown in FIG. 17, the contact surface 1601 (the outside of the contact surface) may include a convex portion or a concave portion (not shown in FIG. 17). In a working process of the bone conduction speaker, the convex portion or the concave portion may contact with the user and change a pressure at different positions on the contact surface 1601 contacted with the face. The convex portion may be in closer contact with the face. Therefore, skin and subcutaneous tissue in contact with the convex portion may be under more pressure than other parts of the face. Accordingly, the skin and subcutaneous tissue in contact with the concave may be subjected to less pressure than other parts. For example, there are three points A, B and C on the contact surface 1601 in FIG. 17, which are located on a non-convex portion, an edge of the convex portion, and the convex portion of the contact surface 1601, respectively. When the contact surface 1601 is in contact with the skin, clamping forces on the skin at the three points A, B, and C may be FC>FA>FB. In some embodiments, the clamping force at point B is 0, i.e., point B does not contact with the skin. Facial skin and subcutaneous tissue may show different resistance and response to sound under different pressures. An impedance of a part with high pressure may be small, which may have a biased high-pass filtering characteristic for a sound wave. An impedance of a part with low pressure may be large, which may have a biased low-pass filtering characteristic for a sound wave. Impedance characteristics L of different parts of the contact surface 1601 may be different. According to Equation (4), frequency responses of different parts may be different when the sound is transmitted. Effect of the sound transmission through the whole contact surface may be equivalent to a sum of effects of the sound transmission through each part. Finally, when the sound is transmitted to the brain, a smooth frequency response curve may be formed to avoid that a resonance peak in low frequency or high frequency is too high. Therefore, an ideal frequency response in a whole audio bandwidth may be obtained. Similarly, a material and thickness of the contact surface 1601 may also affect the sound transmission, thereby affecting the effect of the sound quality. For example, when the material of the contact surface is soft, the transmission effect of the sound wave in the low-frequency range may be better than that in the high-frequency range. When the material of the contact surface is hard, the transmission effect of the sound wave in the high-frequency range may be better than that in the low-frequency range.

Figure 18:
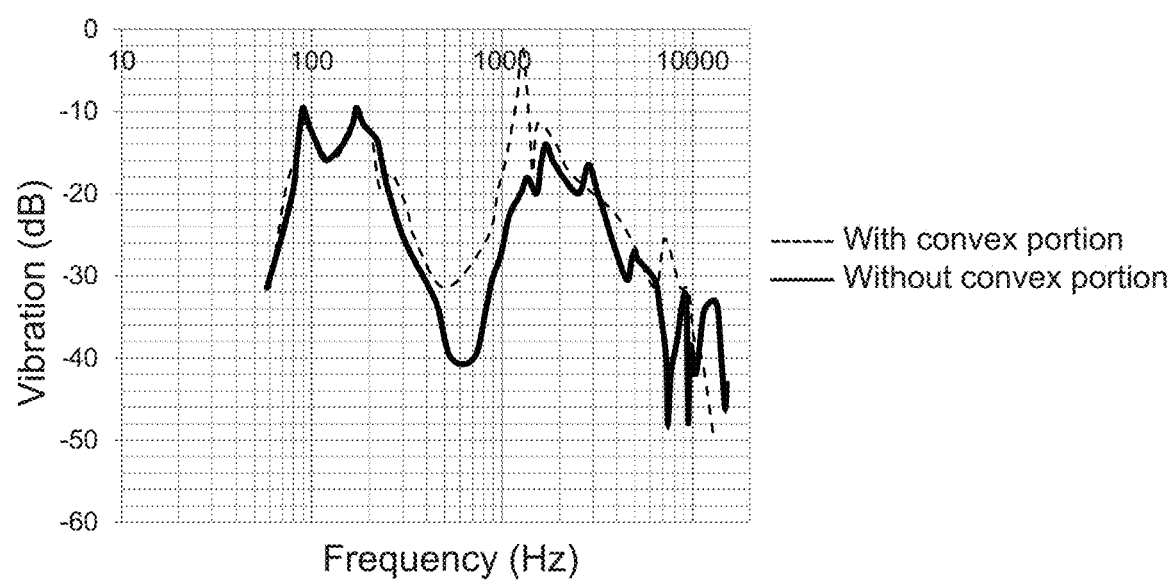
FIG. 18 is a schematic diagram illustrating a vibration response curve of a speaker according to some embodiments of the present disclosure.

FIG. 18 shows frequency responses of a speaker 21 with different contact surfaces. The dashed line corresponds to a frequency response of the speaker 21 with a convex portion on the contact surface, while the solid line corresponds to a frequency response of the speaker 21 without a convex portion on the contact surface. In a middle and low frequency range (e.g., in a range of 300 Hz to 1000 Hz), a vibration of the speaker without a convex portion may be significantly weakened compared with speaker with the convex portion. Therefore, a "pit" may be formed on the frequency response curve, which is not the ideal frequency response, thereby affecting the sound quality of the speaker 21.

The descriptions of FIG. 18 may be only an explanation for a specific example. For those skilled in the art, after understanding the basic principles of the influence on the frequency response of the speaker 21, it may be possible to perform various modifications and variations on the structure and component of the speaker to obtain different frequency response effect.

It should be noted that, for those skilled in the art, the shape and structure of the contact surface 1601 are not limited to the descriptions and may be satisfied other specific requirements. For example, the convex portion or concave portion of the contact surface may be distributed on the edge of the contact surface or in the middle of the contact surface. The contact surface may include one or more convex portions or concave portions, both of which may be distributed on the contact surface. The material of the convex portion or concave portion of the contact surface may be other materials different from the material of the contact surface. The material may be flexible, rigid, or more suitable for production of a specific pressure gradient. The material may be a memorized or non-memorized material. The material may be a single material or a composite material. A structural graphic of the convex portion or concave portion of the contact surface may include but is not limited to an axisymmetric graphic, a central symmetric graphic, a rotational symmetric graphic, an asymmetric graphic, etc. The structural graphic of the convex portion or concave portion of the contact surface may be one type of graphic, or two or more combinations of graphics. The surface of the contact surface may include but not be limited to a certain degree of smoothness, roughness, waviness, etc. A position distribution of the convex portion or concave portion of the contact surface may include but not be limited to axial symmetry, central symmetry, rotational symmetry, asymmetric distribution, etc. The convex portion or concave portion of the contact surface may be at the edge of the contact surface or distributed in the contact surface.

Figure 19:
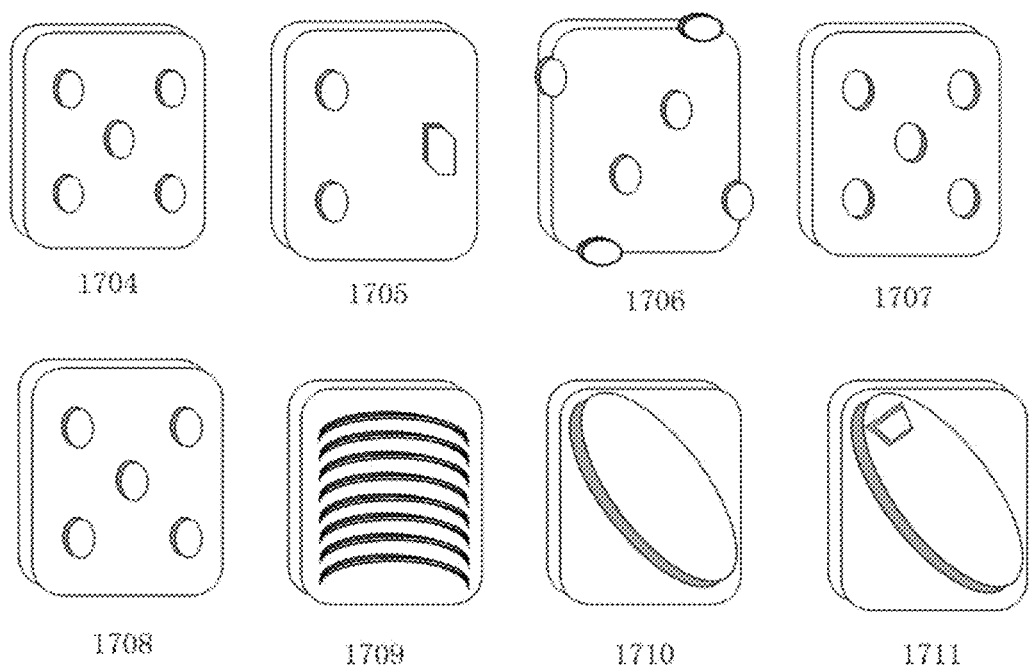
FIG. 19 is a schematic diagram illustrating a contact surface of a vibration unit of a speaker according to an embodiment of the present disclosure.

FIG. 19 is a schematic diagram illustrating a contact surface of a vibration unit of a speaker according to some embodiments of the present disclosure. As shown in FIG. 19, FIG. 19 shows a plurality of exemplary structures of a contact surface. As used herein, 1704 is an example of a contact surface including a plurality of convex portions with a similar shape or a similar structure. The convex portion may be made of a material same as or similar to a material of other portions of a panel. Alternatively, the convex portion may be made of a material different from the material of other portions of the panel. Specifically, the convex portion may consist of a combination of a memory material and a material of a vibration-transfer layer. As used herein, a proportion of the memory material may be larger than or equal to 10%. Preferably, the proportion of the memory material in the convex portion may be larger than or equal to 50%. An area of a single convex portion may be 1% to 80% of a total area. Preferably, the area of the single convex portion may be 5% to 70% of the total area. More preferably, the area of the single convex portion may be 8% to 40% of the total area. A total area of all the convex portions may be 5% to 80% of the total area. Preferably, the total area of all the convex portions may be 10% to 60% of the total area. There may be at least one convex portion. Preferably, there may be one convex portion. More preferably, there may be two convex portions. Further preferably, there may be at least five convex portions. A shape of the convex portion may be circle, oval, triangle, rectangle, trapezoid, irregular polygon, or other similar shapes. As used herein, a structure of the convex portion may be symmetric or asymmetric. A location distribution of the convex portions may also be symmetric or asymmetric. The count of the convex portions may be one or multiple. Heights of the convex portions may be the same or different. The heights and distribution of the convex portions may be designed to form a certain gradient.

1705 is a structure of the convex portion of the contact surface, which is an example of a combination of more than two graphics. As used herein, the count of convex portions of different graphics may be one or more. The shapes of the two or more convex portions may be any two or a combination of a circle, an ellipse, a triangle, a rectangle, a trapezoid, an irregular polygon, or other similar shapes. The material, count, area, symmetry, etc. of the convex portions may be similar to those of 1704.

1706 is an example in which the convex portions of the contact surface are distributed on the edge of and inside the contact surface. As used herein, the count of the convex portions may not be limited to that shown in the figure. A ratio of the count of convex portions located on the edge of the contact surface to the count of all the convex portions may be 1%-80%. Preferably, the ratio may be 5%-70%. More preferably, the ratio may be 10%-50%. Further preferably, the ratio may be 30%-40%. The material, count, area, shape, symmetry, etc. of the convex portion may be similar to those of 1704.

1707 is a structural graphic of the concave portion of the contact surface. The structure of the concave portion may be symmetric or asymmetric. The position distribution of the concave portion may also be symmetric or asymmetric. The count of the concave portions may be one or more. The shapes of the concave portions may be the same or different. The concave portion may be hollow. A ratio of an area of one single concave to the total area of the contact surface may be 1%-80%. Preferably, the ratio may be 5%-70%. More preferably, the ratio may be 8%-40%. A ratio of a total area of all concave portions to the total area of the contact surface may be 5%-80%. Preferably, the ratio may be 10%-60%. There may be at least one concave portion. Preferably, there may be one concave portion. More preferably, there may be two concave portions. Further preferably, there may be at least five concave portions. The shape of the concave portion may be a circle, an ellipse, a triangle, a rectangle, a trapezoid, an irregular polygon, or other similar shapes.

1708 is an example in which there are both convex portions and concave portions on the contact surface. The count of the convex portions and concave portions is not limited to one or more. A ratio of the count of concave portion to the count of convex portions may be 0.1-100. Preferably, the ratio may be 1-80. More preferably, the ratio may be 5-60. Further preferably, the ratio may be 10-20. The material, area, shape, symmetry, etc. of a single convex portion/concave portion may be similar to those of 1704.

1709 is an example of a contact surface with a certain waviness. The waviness may be composed of two or more convex portions/concave portions or a combination of the convex portion and the concave portion. Preferably, distances between adjacent convex portions/concave portions may be equal. More preferably, the distances between the convex portions/concave portions may be equidistant arrangement.

1710 is an example in which there is a convex portion with a large area on the contact surface. A ratio of the area of the convex portion to the total area of the contact surface may be 30%-80%. Preferably, a part of the edge of the convex portion and a part of the edge of the contact surface may be substantially in contact with each other.

1711 is a first convex portion with a large area on the contact surface, and a second convex portion with a small area on the first convex portion. A ratio of the large area to the total area of the contact surface may be 30%-80%, and a ratio of the small area to the total area of the contact surface may be 1%-30%, preferably, the ratio of the small area to the total area of the contact surface may be 5%-20%. A ratio of the small area to the large area may be 5%-80%. Preferably, the ratio of the small area to the total area of the contact surface may be 10%-30%.

The above description of the structure of the contact surface of the speaker is only a specific example, and should not be regarded as the only feasible implementation solution. Obviously, for those skilled in the art, after understanding the basic principle of the sound quality of the speaker affected by the contact surface of the speaker, it may be possible to make various modifications and changes in the form and details of the specific method and operation of implementing the contact surface of the bone conduction speaker without departing from these principles, but these modifications and changes are still within the scope described above. For example, the count of the convex portions or concave portions may not be limited to that shown in FIG. 19, and the above-described convex portions, concave portions, or contact surface graphic may also be modified to a certain extent. For example, the surface may include an animal pattern. These modifications are still within the protection scope described above Inside. Moreover, the contact surface of at least one or more vibrating units contained in the speaker may use the same or different shapes and materials mentioned above. The effect of vibrations transmitted on different contact surfaces may also vary with the properties of the contact surfaces. Finally, different sound quality effects may be obtained.

Figure 20:
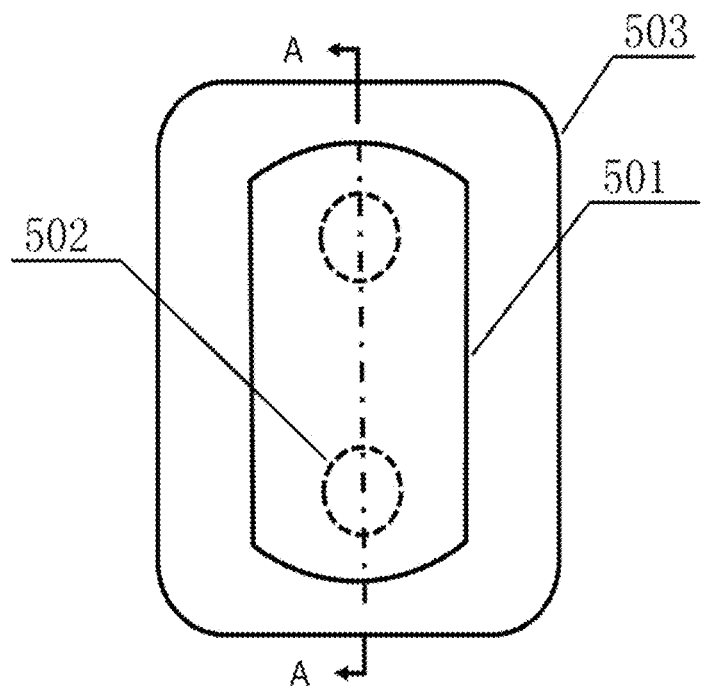
FIG. 20 is a schematic diagram illustrating a vertical view of a bonding manner of a panel of a speaker according to some embodiments in the present disclosure.

In some embodiments, the side of the core housing fitted to the user may be composed of a panel and a vibration transmission layer. FIG. 20 is a front view and a side view of the panel and the vibration transmission layer connected to each other.

In some embodiments, the vibration transmission layer may be provided on an outer surface of a side wall of the core housing in contact with the human body. As used herein, the vibration transmission layer in this embodiment may be a specific embodiment to change physical characteristics of the contact surface of the vibration unit to change the sound transmission effect. Different regions on the vibration transmission layer may have different vibration transmission effects. For example, there may be a first contact surface region and a second contact surface region on the vibration transmission layer. Preferably, the first contact surface region may not be attached to the panel, and the second contact surface region may be attached to the panel. More preferably, when the vibration transmission layer is in direct or indirect contact with a user, a clamping force on the first contact surface region may be less than a clamping force on the second contact surface region (the clamping force herein refers to a pressure between the contact surface of the vibration unit and a user). Further preferably, the first contact surface region may not directly contact the user, and the second contact surface region may directly contact the user and transmit vibrations. An area of the first contact surface region may be different from an area of the second contact surface region. Preferably, the area of the first contact surface region may be smaller than the area of the second contact surface region. More preferably, there may be holes on the first contact surface region to further reduce the area of the first contact surface region. The outer surface (i.e., the surface facing the user) of the vibration transmission layer may be flat or uneven. Preferably, the first contact surface region may be on a plane different from the second contact surface region. More preferably, the second contact surface region may be higher than the first contact surface region. Further preferably, the second contact surface region and the first contact surface region may form a step structure. More preferably, the first contact surface region may be in contact with the user, and the second contact surface region may not be in contact with the user. Materials of the first contact surface region and the second contact surface region may be the same or different. The material may be one or more combinations of the vibration transmission layer materials described above. The above description of the clamping force on the contact surface is only a manifestation of the present disclosure. Those skilled in the art may modify the structure and manner described above according to actual requirements, and these modifications are still within the protection scope of the present disclosure. For example, the vibration transmission layer may be unnecessary. The panel may directly contact the user. Different contact surface regions may be provided on the panel. The different contact surface regions may have a same property as the first contact surface region and second contact surface region described above. As another example, a third contact surface region may be provided on the contact surface. The third contact surface region may have structures different from the first contact surface region and the second contact surface region, and these structures may obtain certain effects on reducing housing vibrations, suppressing sound leakage, improving the frequency response curve of the vibration unit, etc.

Figure 21:
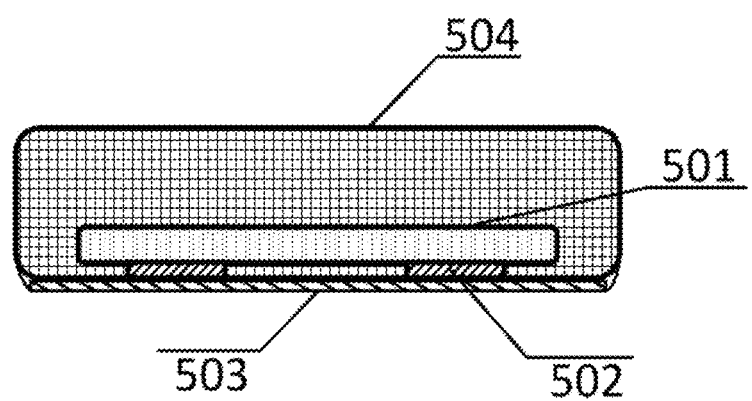
FIG. 21 is a schematic diagram illustrating a vertical view of a bonding manner of a panel of a speaker according to some embodiments in the present disclosure.

As shown in FIG. 20 and FIG. 21, in some embodiments, a panel 501 and a vibration transmission layer 503 may be bonded by glue 502. Bonded portions may be located at both ends of the panel 501. The panel 501 may be located in a housing formed by the vibration transmission layer 503 and the housing 504. Preferably, a projection of the panel 501 on the vibration transmission layer 503 may be the first contact surface region, and a region around the first contact surface region may be the second contact surface region.

Figure 22:
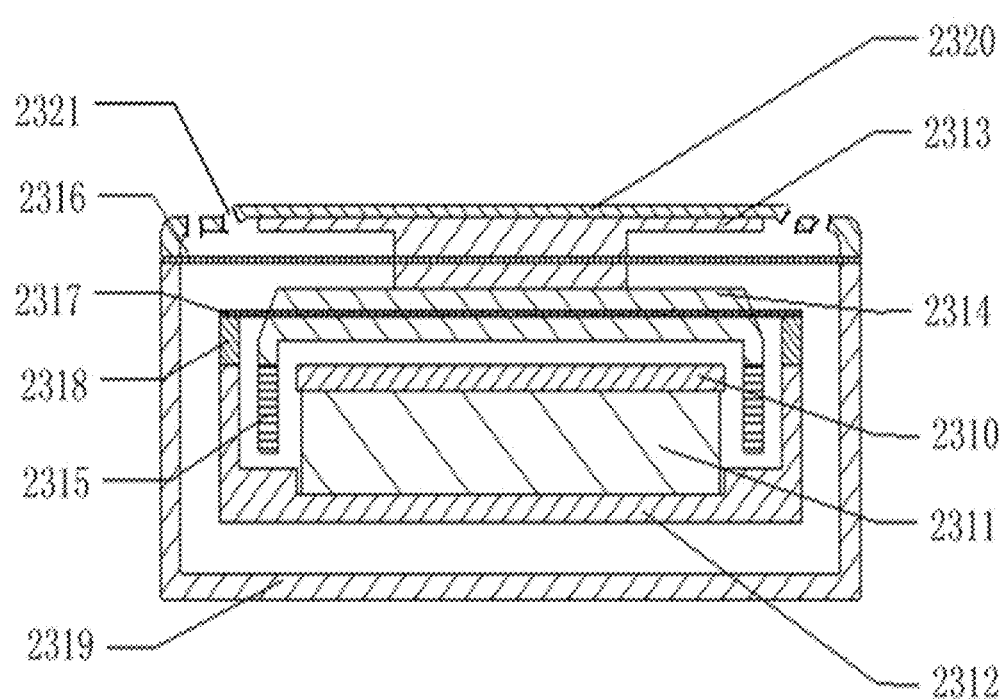
FIG. 22 is a structural diagram illustrating a vibration generating portion of a speaker according to some embodiments of the present disclosure.

In a specific embodiment, as shown in FIG. 22, a transducing device may include a magnetic circuit system including a magnetic conduction plate 2310, a magnet 2311, and a magnetizer 2312, a vibration plate 2314, a coil 2315, a first vibration transmission plate 2316, a second vibration transmission plate 2317, and a gasket 2318. In this embodiment, a compound vibration device may include the vibration plate 2314, the first vibration transmission plate 2316, and the second vibration transmission plate 2317. A panel 2213 may protrude from a housing 2319, and be bonded to the vibration plate 2314 by glue. The first vibration transmission plate 2316 may connect and fix the transducing device on the housing 2319 to form a suspension structure. A vibration transmission layer 2320 (such as but not limited to silica gel) may be added on the panel 2313. The vibration transmission layer 2320 may produce a certain deformation to adapt to the shape of the skin. A portion of the vibration transmission layer 2320 that is in contact with the panel 2313 may be higher than a portion of the vibration transmission layer 2320 that is not in contact with the panel 2313, thereby forming a step structure. One or more small holes 2321 may be disposed in the portion of the vibration transmission layer 2320 that is not in contact with the panel 2313 (the part where the vibration transmission layer 2320 does not protrude in FIG. 22). Designing the small holes in the vibration transmission layer may reduce sound leakage. That is, a connection between the panel 2313 and the housing 2319 through the vibration transmission layer 2320 may be weakened, and the vibration of the panel 2313 transmitted to the housing 2319 through the vibration transmission layer 2320 may be reduced, thereby reducing the sound leakage caused by the vibration of the housing 2319. An area of the non-protruding portion of the vibration transmission layer 2320 may be reduced after the small hole 2321 is provided, air that can be driven may be reduced, and the sound leakage caused by air vibration may be reduced. After the small holes 2321 are provided in the non-protruding portion of the vibration transmission layer 2320, the air vibration in the housing may be guided out of the housing, and the air vibration in the housing and the air vibration caused by the housing 2319 may be mutually offset to reduce the sound leakage. It should be noted that because the small hole 2321 may guide sound waves in the housing of the composite vibration device out to superimpose the leakage sound wave and further reduce the sound leakage, the small hole may also be called a sound guiding hole.

It should be noted herein that, in this embodiment, since the panel protrudes from the housing of the speaker, and the panel and the housing of the speaker is connected using the first vibration plate, a degree of coupling between the panel and the housing may be greatly reduced, and the first vibration transmission plate may provide a certain deformation, so that the panel may have a higher degree of freedom when the panel is fitted to the user, which may better adapt to a complex bonding surface. The first vibration transmission plate may make the panel produce a certain angle of inclination relative to the housing. Preferably, the inclination angle may be less than or equal to 5 degrees.

Figure 23:
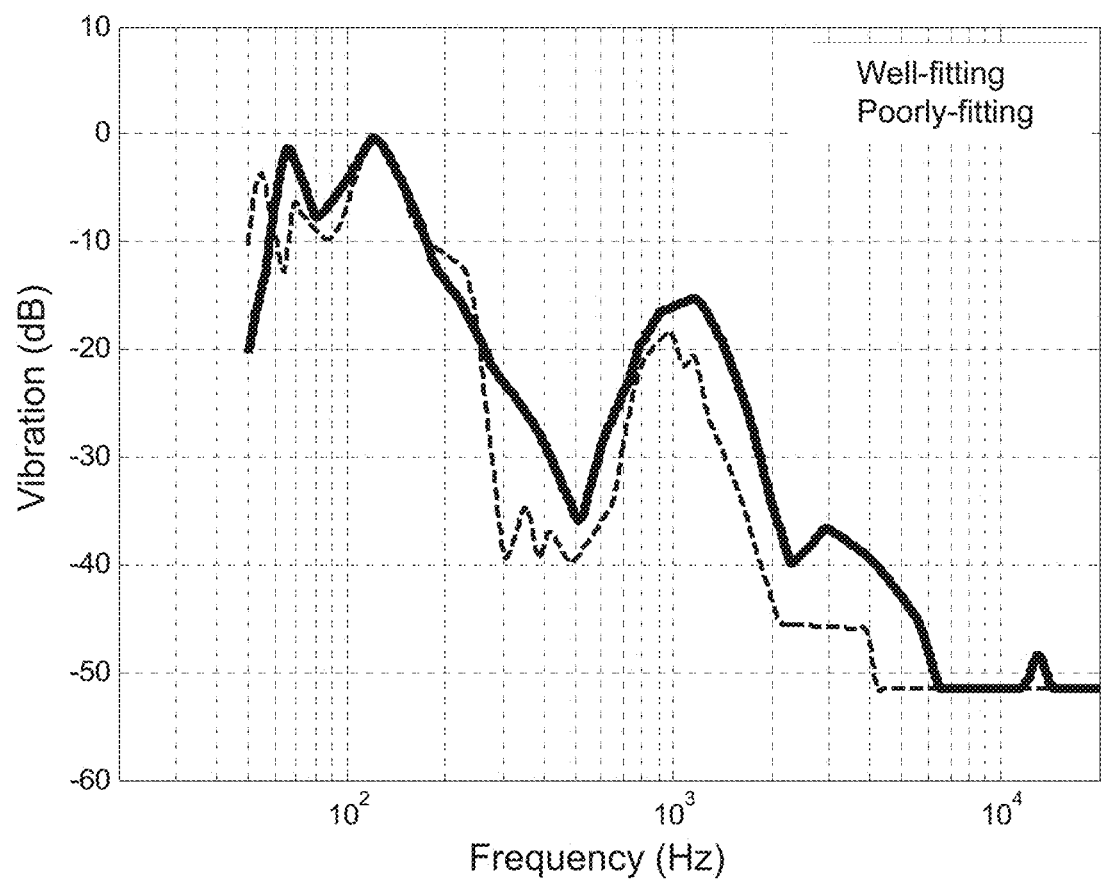
FIG. 23 is a schematic diagram illustrating a vibration response curve of a vibration generating portion of a speaker according to some embodiments of the present disclosure.

Further, a vibration efficiency of the speaker 21 may vary with a fitting state. A speaker with a better fitting state may have a higher vibration transmission efficiency. As shown in FIG. 23, the thick line shows a vibration transmission efficiency in a better fitting state, and the thin line shows a vibration transmission efficiency in a poorly-fitting state. It may be seen that the vibration transmission efficiency in a well-fitting state is higher.

Figure 24:
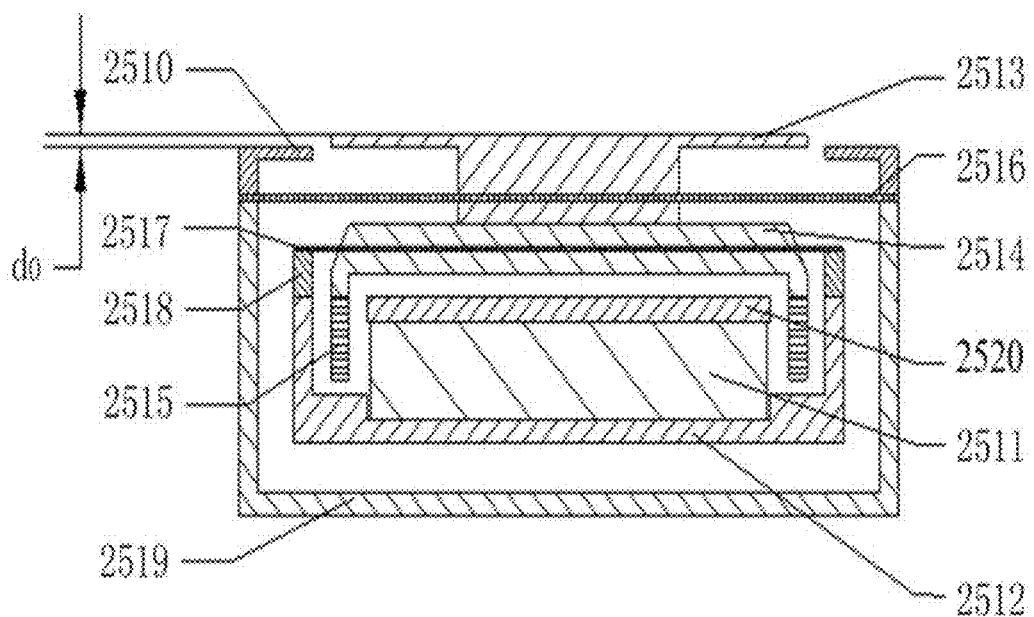
FIG. 24 is a structural diagram illustrating a vibration generating portion of a speaker according to some embodiments of the present disclosure.

FIG. 24 is a structural diagram illustrating a vibration generating part of a speaker according to some embodiments of the present disclosure. As shown in FIG. 24, as a specific embodiment, in this embodiment, a transducing device may include a magnetic circuit system constituted by a magnetic conduction plate 2510, a magnet 2511, and a magnetizer 2512, a vibration plate 2514, a coil 2515, a first vibration transmission plate 2516, a second vibration transmission plate 2517, and a gasket 2518. A panel 2513 may protrude from a housing 2519, and be bonded to the vibration plate 2514 by glue. The first vibration transmission plate 2516 may connect and fix the transducing device on the housing 2519 to form a suspension structure.

A difference between this embodiment and the above-mentioned embodiment in FIG. 22 is that a border is added to the edge of the housing. In a contact between the housing and the skin, the border may make the force distribution more even and increase wearing comfort of the speaker. There may be a height difference do between the border 2510 and the panel 2513. The force of the skin acting on the panel 2513 may reduce a distance d between the panel 2513 and the border 2510. When a pressure between the speaker and a user is greater than a force experienced when the first vibration transmission plate 2516 is deformed into d0, the excess clamping force may be transmitted to the skin through the border 2510 without affecting the clamping force of the vibrating portion, thereby making the clamping force more consistent and ensuring sound quality.

In typical cases, the sound quality of the speaker 21 may be affected by various factors such as the physical properties of components of the speaker, vibration transmission relationship(s) between the components, a vibration transmission relationship between the speaker and the outside, and the efficiency of a vibration transmission system when vibration is transmitted. The components of the speaker may include a component that generates the vibration (e.g., but is not limited to a transducing device), a component that fixes the speaker 21 (e.g., but is not limited to a glasses frame), and a component that transmits the vibration (e.g., but is not limited to a panel, a vibration transmission layer, etc.). The vibration transmission relationship(s) between the components and the vibration transmission relationship between the speaker and the outside may be determined by a contact mode (e.g., but is not limited to, a clamping force, a contact area, a contact shape, etc.) between the speaker and the user.

It should be noted that the above description of the step structure of the speaker 21 on the glasses is only a specific example, and should not be regarded as the only feasible implementation. Obviously, for those skilled in the art, after understanding the basic principle of the step structure of the speaker 21 on the glasses, it may be possible to make various modifications and changes in the form and details of the specific method and operation of implementing the step structure of the speaker 21 on the glasses without departing from these principles, but these modifications and changes are still within the scope described above. For example, the vibration transmission layer may not be limited to one layer, but may also be a plurality of layers. The specific number of layers may be determined according to actual conditions. In this application, the specific number of vibration transmission layers is not specifically limited herein. As another example, the number of the step structure formed between the vibration transmission layer and the panel may not be limited to one in FIG. 24. When there are a plurality of vibration transmission layers, the step structure may be formed between each vibration transmission layer and the panel and between the vibration transmission layers. Such deformations are all within the protection scope of this application.

In some embodiments, the speaker of the glasses may be a standalone earphone that can be used directly, or also be an earphone plugged into an electronic device for use. In an application scenario, the earphone in this embodiment is one of the speakers 21 in the above glasses implementation.

Figure 25:
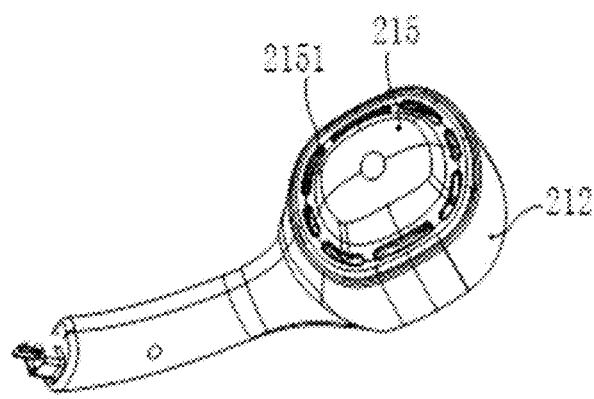
FIG. 25 is a structural diagram illustrating a speaker according to some embodiments of the present disclosure.
Figure 26:
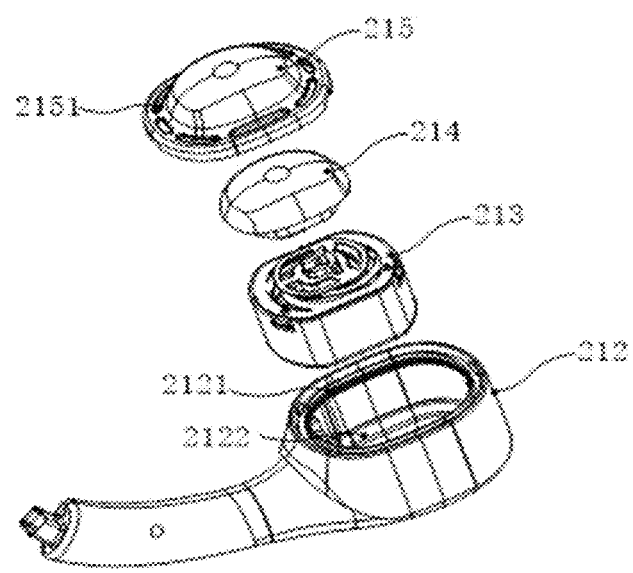
FIG. 26 is an exploded diagram illustrating a speaker according to some embodiments of the present disclosure.
Figure 27:
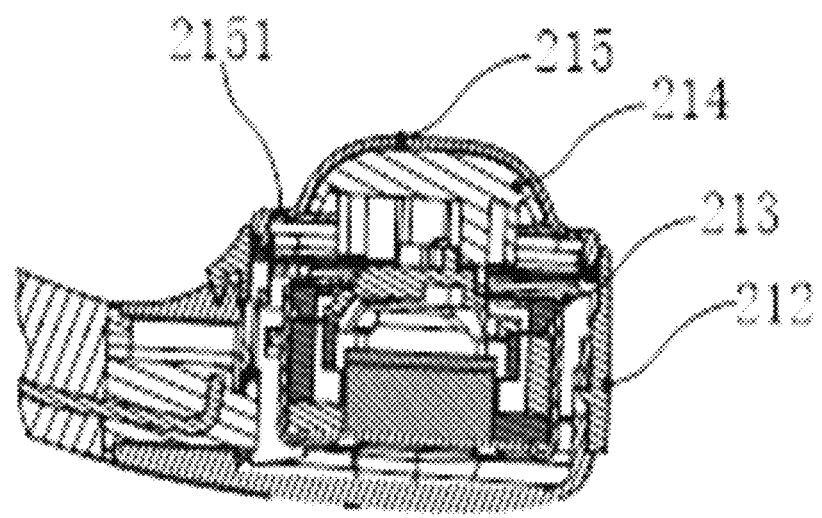
FIG. 27 is a sectional view along a symmetry plane of the earphone in FIG. 25.

In some embodiments, FIG. 25 is a schematic structural diagram illustrating an earphone according to an embodiment of the disclosure. FIG. 26 is an exploded structural diagram illustrating an earphone according to an embodiment of the disclosure. FIG. 27 is a sectional view along a symmetry plane of the earphone in FIG. 25. In this embodiment, the speaker may include a core housing 212 and an earphone core. The earphone core may include a transducing device 213, a vibration transmission plate 214, and a vibration transmission layer 215. The core housing 212 and the vibration transmission layer 215 herein may be equivalent to the vibration transmission layer 2320 in FIG. 22 of this application.

As used herein, the core housing 212 may be configured to define an accommodation chamber 2122 of a speaker (e.g., the speaker 21) with an opening 2121, which may be used to accommodate related functional structures of the speaker. For example, the transducing device 213 may be accommodated in the accommodation chamber 2122 of the speaker.

Specifically, the transducing device 213 may be configured to generate vibrations according to audio signals. As used herein, the audio signal may be an audio signal directly stored in the transducing device 213, or an audio signal input to the transducing device 213 from a storage device or a communication circuit through a signal line or the like, which is not limited herein.

Further, the vibration transmission plate 214 may be connected to the transducing device 213, and exposed from the opening 2121 of the accommodation chamber 2122 to transmit the vibration. Specifically, the transducing device 213 may convert the audio signal into a corresponding vibration signal, and further transmit the vibration signal through the vibration transmission plate 214 to transmit the vibration signal from the accommodation chamber 2122 of the core housing 212 to an outside of the core housing 212. The vibration signal may be further transmitted to users who directly or indirectly contact the vibration transmission plate 214.

In addition, the vibration transmission layer 215 may be coated on an outer surface of the vibration transmission plate 214, so that the vibration signal generated by the transducing device 213 may be transmitted to a transmission layer of the vibration transmission plate 214 through the vibration transmission plate 214, and then the vibration signal may be transmitted to the user by contacting a specific part of the user. In this embodiment, the vibration transmission layer 215 may be further connected to the core housing 212 to cover the opening 2121 of the accommodation chamber 2122, thereby protecting elements in the accommodation chamber 2122 of the core housing 212. Specifically, the vibration transmission layer 215 may be connected to the core housing 212 by means of insertion, buckling, bonding, etc. For example, the vibration transmission layer 215 may be buckled on a periphery of the core housing 212 by buckling.

In an application scenario, the vibration transmission plate 214 may be made of a hard material, such as hard plastic, to better transmit the vibration signal. The vibration transmission layer 215 may be made of a soft material, such as soft silica gel, to coat the outer surface of the vibration transmission plate 214. Therefore, the bone conduction earphone may further transmit the vibration signal to the user through the vibration transmission layer 215, so that the user may have a better tactile feeling when using the speaker.

It should be noted that the vibration transmission layer 215 in this embodiment is coated on the outer surface of the vibration transmission plate 214 by an integral injection molding manner. Therefore, the vibration transmission layer 215 and the vibration transmission plate 214 may be integrated. Hence, when assembling the speaker, there is no need to further glue the vibration transmission layer 215 and the vibration transmission plate 214 together by means such as glue, thereby simplifying assembly operations of the speaker. At the same time, the vibration transmission plate 214 and the vibration transmission layer 215 may be integrated, which may avoid an adverse effect of an uneven thickness of a glue layer between the vibration transmission plate 214 and the vibration transmission layer 215 caused by glue dispensing on the vibration transmission effect. Therefore, the transmission effect of vibration may be improved, and the sound transmission quality of the speaker may be improved.

As used herein, in one embodiment, the vibration transmission plate 214 may protrude from the opening 2121 to transmit the vibration signal generated by the transducing device 213 in the accommodation chamber 2122 of the core housing 212 in the speaker to the outside of the accommodation chamber 2122. Then the vibration signal may be transmitted to the user through the vibration transmission layer 215.

The vibration transmission layer 215 and a portion of the outer surface of the vibration transmission plate 214 exposed from the opening 2121 may be fully fitted to each other and integrally molded. Specifically, in an application scenario, the portion of the outer surface of the vibration transmission plate 214 exposed from the opening 2121 may be a curved surface protruding away from the accommodation chamber 2122. Correspondingly, the vibration transmission layer 215 may be fully fitted to the vibration transmission plate 214 and integrated by the injection molding manner through the curved surface. It should be noted that, if the vibration transmission plate 214 and the vibration transmission layer 215 are fully fitted by dispensing glue, first of all, as mentioned above, it is difficult to control uniformity of the formed glue layer due to the influence of air and dispensing technology, thereby reducing the vibration transmission effect. Secondly, if the full fit is performed by dispensing, the dispensing glue is likely to overflow in order to achieve the full fit. On one hand, the uniformity of the glue layer may be further reduced, and on the other hand, it also brings inconvenience to the assembly of the speaker. In this embodiment, the vibration transmission plate 214 and the vibration transmission layer 215 may be fully fitted by the integral injection molding manner, so as to avoid the adverse effects of the full fitting achieved by the above-mentioned dispensing. In addition, on one hand, an area where the vibration transmission layer 215 and the vibration transmission plate 214 are fitted may be increased, thereby improving the vibration transmission effect. On the other hand, the curved surface may also increase the contact area between the vibration transmission layer 215 and user's skin, thereby further improving the transmission effect of the vibration. Specifically, the portion of the outer surface of the vibration transmission plate 214 exposed from the opening 2121 may be a flat surface in a middle part and a curved surface at the peripheral part.

As used herein, in one embodiment, the vibration transmission plate 214 may be spaced apart from the core housing 212 at the opening 2121 to form an annular spaced region around the vibration transmission plate 214. A through hole 2151 may be disposed on a corresponding region of the vibration transmission layer 215 in the annular spaced region.

In this embodiment, the vibration transmission plate 214 may not be connected to the core housing 212. Specifically, an inner side of the core housing 212 and an outer side of the vibration transmission plate 214 at the opening 2121 may be both circular or similar to circular. Therefore, the core housing 212 and the vibration transmission plate 214 may jointly form an annular spaced region.

The vibration transmission layer 215 may be coated and disposed on the outer surface of the vibration transmission plate 214, and connected to the core housing 212 to cover the opening 2121 of the accommodation chamber 2122. Therefore, a direction away from the accommodation chamber 2122 of the annular spaced region may be covered by the vibration transmission layer 215.

In this embodiment, the through hole 2151 may be further disposed in the region of the vibration transmission layer 215 corresponding to the annular spaced region. Specifically, a shape of the through hole 2151 may be a circle, an ellipse, etc. The count of the through hole 2151 may be one or more, which is not limited herein. When a plurality of through holes 2151 are disposed, the through holes 2151 may be disposed apart from each other around the vibration transmission plate 214.

It should be noted that, in this embodiment, the through hole 2151 may connect the accommodation chamber 2122 with the outside of the core housing 212, thereby further reducing sound leakage through vibration cancellation. Therefore, the sound transmission effect of the speaker may be further improved.

It should be noted that the above description of the structure of the earphone core on the glasses is only a specific example and should not be regarded as the only feasible implementation. Obviously, for those skilled in the art, after understanding the basic principle of the structure of the earphone core on the glasses, it may be possible to make various modifications and changes in the form and details of the specific method and operation of implementing the structure of the earphone core on the glasses without departing from these principles, these modifications and changes are still within the scope described above. For example, the shape of the vibration transmission plate 214 may be oval. Such deformations are all within the protection scope of this application.

Figure 28:
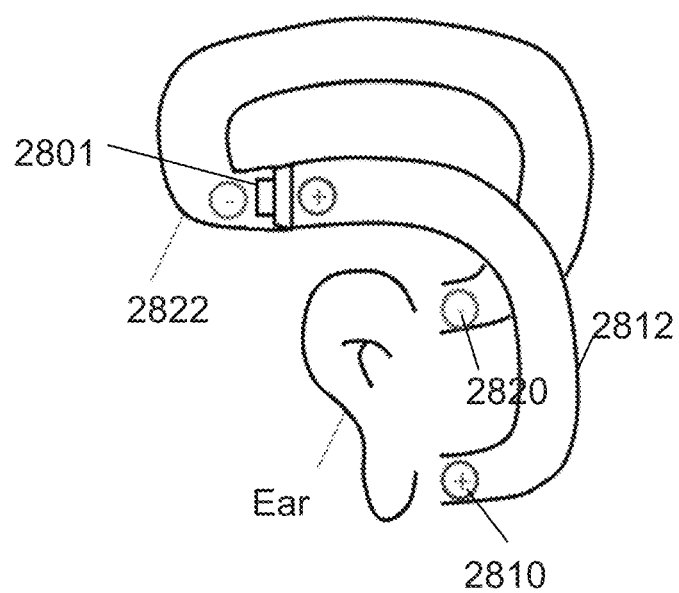
FIG. 28 is a schematic diagram illustrating transmitting sound through air conduction according to some embodiments of the present disclosure.

In some embodiments, the speaker described above may also transmit the sound to the user through air conduction. When the air condition is used to transmit the sound, the speaker may include one or more sound sources. The sound source may be located at a specific position of the user's head, for example, the top of the head, a forehead, a cheek, a temple, an auricle, the back of an auricle, etc., without blocking or covering an ear canal. FIG. 28 is a schematic diagram illustrating transmitting sound through air conduction according to some embodiments of the present disclosure.

As shown in FIG. 28, a sound source 2810 and a sound source 2820 may generate sound waves with opposite phases ("+" and in the figure may indicate the opposite phases). For brevity, the sound sources mentioned herein may refer to sound outlets of the speaker that may output sounds. For example, the sound source 2810 and the sound source 2820 may be two sound outlets respectively located at specific positions of the speaker (e.g., the core housing 108 in FIG. 25, or the glasses temple 121).

In some embodiments, the sound source 2810 and the sound source 2820 may be generated by the same vibration device 2801. The vibration device 2801 may include a diaphragm (not shown in the figure). When the diaphragm is driven to vibrate by an electric signal, the front side of the diaphragm may drive air to vibrate. The sound source 2810 may form at the sound output through a sound guiding channel 2812. The back of the diaphragm may drive air to vibrate, and the sound source 2820 may be formed at the sound output hole through a sound guiding channel 2822. The sound guiding channel may refer to a sound transmission route from the diaphragm to the corresponding outlet. In some embodiments, the sound guiding channel may be a route surrounded by a specific structure (e.g., the core housing 212 in FIG. 28, or the glasses temple 15 in FIG. 7) on the speaker. It should be noted that in some alternative embodiments, the sound source 2810 and the sound source 2820 may also be generated by different vibrating diaphragms of different vibration devices, respectively.

Among the sounds generated by the sound source 2810 and the sound source 2820, one portion may be transmitted to the ear of the user to form the sound heard by the user. Another portion may be transmitted to the environment to form a leaked sound. Considering that the sound source 2810 and the sound source 2820 are relatively close to the ears of the user, for convenience of description, the sound transmitted to the ears of the user may be referred to as a near-field sound. The leaked sound transmitted to the environment may be referred to as a far-field sound. In some embodiments, the near-field/far-field sounds of different frequencies generated by the speaker may be related to a distance between the sound source 2810 and the sound source 2820. Generally speaking, the near-field sound generated by the speaker may increase as the distance between the two sound sources increases, while the generated far-field sound (the leaked sound) may increase with increasing the frequency.

For the sounds of different frequencies, the distance between the sound source 2810 and the sound source 2820 may be designed, respectively, so that a low-frequency near-field sound (e.g., a sound with a frequency of less than 800 Hz) generated by the speaker may be as large as possible and a high-frequency far-field sound (e.g., a sound with a frequency greater than 2000 Hz) may be as small as possible. In order to implement the above purpose, the speaker may include two or more sets of dual sound sources. Each set of the dual sound sources may include two sound sources similar to the sound source 2810 and the sound source 2820, and generate sounds with specific frequencies, respectively. Specifically, a first set of the dual sound sources may be used to generate low frequency sounds. A second set of the dual sound sources may be used to generate high frequency sounds. In order to obtain more low-frequency near-field sounds, the distance between two sound sources in the first set of the dual sound sources may be set to a larger value. Since the low-frequency signal has a longer wavelength, the larger distance between the two sound sources may not cause a large phase difference in the far-field, and not form excessive leaked sound in the far-field. In order to make the high-frequency far-field sound smaller, the distance between the two sound sources in the second set of the dual sound sources may be set to a smaller value. Since the high-frequency signal has a shorter wavelength, the smaller distance between the two sound sources may avoid the generation of the large phase difference in the far-field, and thus the generation of the excessive leaked sounds may be avoided. The distance between the second set of the dual sound sources may be less than the distance between the first set of the dual sound sources.

The beneficial effects of the embodiments of the present disclosure may include but be not limited to the following. (1) When the hinge is pushed by the connection to switch the state, the hinge may change abruptly in an appropriate level, thereby providing convenience for users. (2) The structure and shape of the vibration unit may be changed through the gradient structure to change the sound transmission effect, thereby changing the sound quality of the bone conduction speaker. (3) A higher fitting effect with the user may be achieved through the step structure. (4) The sound transmission effect of the speaker may be further improved through the earphone core. It should be noted that different embodiments may produce different beneficial effects. In different embodiments, the possible beneficial effects may be any one or a combination of the above, or any other beneficial effects that may be obtained.

The above are only implementations of this application, and do not limit the scope of this application. Any equivalent structure or equivalent process transformation made by using the description and drawings of this application, or directly or indirectly applied to other related technical fields, may be included in the scope of patent protection of this application.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "device," "unit," "component," or "system." Furthermore, aspects of the present disclosure may take the form of a computer program product embodied in one or more computer-readable media having computer-readable program code embodied thereon.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A glasses, comprising:
a glasses frame including a glasses rim and two glasses temples, the two glasses temples being rotatably connected to the glasses rim, respectively; and
two speakers, wherein for each of the two speakers,
the speaker includes an earphone core and a core housing,
the speaker is connected to one of the two glasses temples via a hinge component of the glasses temple connected thereto,
the hinge component is rotatable to change a position of the speaker relative to the glasses temple,
wherein the hinge component includes a hinge, a rod-shaped member, and a fixing member, and the hinge includes:
a hinge mount;
a hinge arm rotatably connected to the hinge mount via a rotating shaft, and being rotatable relative to the hinge mount when an external force is applied to the hinge arm to change the position of the speaker relative to the glasses temple;

a support member flexibly disposed on the hinge mount; and an elastic member configured to elastically offset the support member toward the hinge arm so that the support member elastically abuts on the hinge arm, and the glasses temple connected to the speaker includes at least one of a control circuit or a battery, the at least one of the control circuit or the battery being configured to drive the earphone core of the speaker to vibrate to generate sound.

2. The glasses of claim 1, wherein the hinge arm includes a first support surface and a second support surface connected to each other, the support member includes a third support surface, when the elastic member elastically offsets the support member toward the hinge arm, the third support surface elastically abuts on the first support surface and the second support surface, respectively, and when the hinge arm rotates relative to the hinge mount due to the external force, a connection between the first support surface and the second support surface drives the support member against the elastic offset of the elastic member to move in an opposite direction so that the third support surface is switched from being elastically abutting on one of the first support surface and the second support surface to being elastically abutting on the other of the first support surface and the second support surface.

3. The glasses of claim 2, wherein in a section perpendicular to a central axis of the rotating shaft, a ratio of a maximum distance between the rotating shaft and the connection to a shortest distance between the rotating shaft and the first support surface is in a range from 1.1 to 1.5.

4. The glasses of claim 2, wherein an included angle between the hinge mount and the hinge arm decreases when the third support surface is switched from elastically abutting on the first support surface to elastically abutting on the second support surface.

5. The glasses of claim 2, wherein an external force required when the third support surface is switched from elastically abutting on the first support surface to elastically abutting on the second support surface is different from an external force required when the third support surface is switched from elastically abutting on the second support surface to elastically abutting on the first support surface.

6. The glasses of claim 2, wherein in a section perpendicular to a central axis of the rotating shaft, the connection has an arc shape.

7. The glasses of claim 6, wherein the connection has a circular arc shape, and a curvature of the circular arc is between 5 and 30.

8. The glasses of claim 2, wherein in a section perpendicular to a central axis of the rotating shaft, an included angle between the first support surface and the second support surface is an obtuse angle.

9. The glasses of claim 2, wherein the hinge mount includes a mount body, a first lug, and a second lug, the first lug and the second lug being protruding from the mount body and spaced apart from each other, the hinge arm includes an arm body and a third lug protruding from the arm body, and the third lug is inserted into an interval region between the first lug and the second lug, and rotatably connected to the first lug and the second lug via the rotating shaft.

10. The glasses of claim 9, wherein at least part of the support member is disposed inside the interval region and located at a side of the third lug facing the mount body, the mount body includes an accommodation chamber communicating with the interval region, the elastic member is disposed inside the accommodation chamber, and the support member elastically offsets toward the third lug.

11. The glasses of claim 1, wherein the core housing includes a contact surface, the contact surface includes a gradient structure for causing an uneven distribution of pressure on the contact surface when in contact with a user, the gradient structure includes at least one convex portion or at least one concave portion.

12. The glasses of claim 11, wherein the gradient structure is located at a center or an edge of the contact surface.

13. The glasses of claim 11, wherein the contact surface is in direct or indirect contact with the user, and the contact surface includes a first contact surface region and a second contact surface region, a protrusion degree of the second contact surface region being greater than a protrusion degree of the first contact surface region.

14. The glasses of claim 1, wherein the earphone core includes a transducing device disposed inside an accommodation chamber with an opening formed by the core housing, and being capable of generating a vibration based on an audio signal;

a vibration transmission plate connected to the transducing device and exposed from the opening to transmit the vibration; and a vibration transmission layer covering an outer surface of the vibration transmission plate in an integral injection molding manner, and further being connected to the core housing to seal the opening.

15. The glasses of claim 14, wherein the vibration transmission plate protrudes from the opening, and the vibration transmission layer is fitted with the outer surface of the vibration transmission plate in an integral injection molding manner.

16. The glasses of claim 14, wherein the vibration transmission plate is spaced apart from the core housing at the opening to form an annular spaced region around the vibration transmission plate, and the vibration transmission layer includes at least one through hole at a region corresponding to the annular spaced region.

17. The glasses of claim 16, wherein the at least one through hole includes a plurality of through holes, the plurality of through holes being arranged around the vibration transmission plate at intervals.

18. The glasses of claim 14, wherein the vibration transmission plate includes hard rubber, and the vibration transmission layer includes soft rubber.

* * * * *